United States Patent
Rice et al.

(10) Patent No.: US 10,173,646 B1
(45) Date of Patent: Jan. 8, 2019

(54) SEQUENTIAL SENSOR CLEANING SYSTEM FOR AUTONOMOUS VEHICLE

(71) Applicant: Uber Technologies, Inc., San Francisco, CA (US)

(72) Inventors: Wesly Mason Rice, Glenshaw, PA (US); Nikolaus Wittenstein, Glenshaw, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/643,598

(22) Filed: Jul. 7, 2017

(51) Int. Cl.
  *B60S 1/56* (2006.01)
  *B60S 1/48* (2006.01)
  *B60K 1/00* (2006.01)

(52) U.S. Cl.
  CPC ............. *B60S 1/56* (2013.01); *B60S 1/485* (2013.01)

(58) Field of Classification Search
  CPC . B60S 1/56; B60S 1/481; H04N 5/225; B60R 1/06
  USPC .......................................................... 701/49
  See application file for complete search history.

(56) References Cited

U.S. PATENT DOCUMENTS

| | | | | |
|---|---|---|---|---|
| 4,324,363 | A * | 4/1982 | Rauen, Jr. ............. | B60S 1/603 15/250.002 |
| 9,880,382 | B1 * | 1/2018 | Tippy ................. | G02B 27/0006 |
| 2007/0084484 | A1 * | 4/2007 | Porter ................... | B60S 1/485 134/18 |
| 2011/0073142 | A1 * | 3/2011 | Hattori ................. | B60S 1/0848 134/56 R |
| 2012/0266922 | A1 * | 10/2012 | Krahn ..................... | B60S 1/52 134/123 |
| 2014/0009615 | A1 * | 1/2014 | Kiyohara ............... | H04N 7/18 348/148 |
| 2017/0182981 | A1 * | 6/2017 | Hsiao ..................... | B60S 1/56 |

OTHER PUBLICATIONS

Rice et al., U.S. Appl. No. 15/482,219, filed Apr. 7, 2017, Autonomous Vehicle Sensor Cleaning System.
Rice et al., U.S. Appl. No. 15/482,251, filed Apr. 7, 2017, Autonomous Vehicle Sensor Cleaning System.

* cited by examiner

*Primary Examiner* — Tan Q Nguyen
(74) *Attorney, Agent, or Firm* — Dority & Manning, PA

(57) ABSTRACT

Systems and methods for cleaning one or more sensors on an autonomous vehicle according to a sensor cleaning system are provided. A method can include obtaining, by a computing system comprising one or more computing devices, data indicative of a sensor condition for the autonomous vehicle. The method can further include determining, by the computing system, a sensor cleaning sequence for one or more sensor cleaning units of the autonomous vehicle based at least in part on the data indicative of the sensor condition. The one or more sensor cleaning units can be configured to respectively clean one or more sensors of the autonomous vehicle. The method can further include controlling, by the computing system, the one or more sensor cleaning units to sequentially clean the one or more sensors based at least in part on the sensor cleaning sequence.

20 Claims, 6 Drawing Sheets

SEQUENTIAL SENSOR CLEANING SYSTEM FOR AUTONOMOUS VEHICLE

FIELD

The present disclosure relates generally to a sensor cleaning system. More particularly, the present disclosure relates to a sensor cleaning system that sequentially cleans one or more sensors according to a sensor cleaning sequence based at least in part on data indicative of a sensor condition.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on sensor data collected by the sensors. Given knowledge of its surrounding environment, the autonomous vehicle can identify an appropriate motion path through such surrounding environment.

Thus, a key objective associated with an autonomous vehicle is the ability to perceive the location of objects that are proximate to the autonomous vehicle and/or determine other information about the autonomous vehicle and its relationship to the surrounding environment. One aspect such objective is the collection of sensor data by the variety of sensors included in or otherwise coupled to the vehicle.

However, autonomous vehicle sensors can suffer from the presence of precipitation, debris, contaminants, or environmental objects which interfere with the ability of the sensor to collect the sensor data. As one example, rain, snow, frost, or other weather-related conditions can degrade the quality of the sensor data collected by a given sensor when present. For example, raindrops, snow, or other condensation can collect on the lens or other components of a sensor (e.g., a camera or a Light Detection and Ranging (LIDAR) sensor), thereby degrading the quality of the sensor data collected by the sensor. As another example, dirt, dust, road salt, organic matter (e.g., "bug splatter," pollen, bird droppings, etc.), or other contaminants can accumulate on or adhere to a given sensor (e.g., on the sensor cover, housing, or other external component of the sensor), thereby degrading the quality of the sensor data collected by the sensor.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to clean autonomous vehicle sensors. The method can include obtaining, by a computing system comprising one or more computing devices, data indicative of a sensor condition for the autonomous vehicle. The method can further include determining, by the computing system, a sensor cleaning sequence for one or more sensor cleaning units of the autonomous vehicle based at least in part on the data indicative of the sensor condition. The one or more sensor cleaning units can be configured to respectively clean one or more sensors of the autonomous vehicle. The method can further include controlling, by the computing system, the one or more sensor cleaning units to sequentially clean the one or more sensors based at least in part on the sensor cleaning sequence.

Another example aspect of the present disclosure is directed to a sensor cleaning system for an autonomous vehicle. The sensor cleaning system can include one or more sensor cleaning units configured to respectively clean one or more sensors of an autonomous vehicle. The sensor cleaning system can further include a computing system comprising one or more processors and one or more non-transitory computer-readable media that collectively store instructions that, when executed by the one or more processors, cause the computing system to perform operations. The operations can include obtaining data indicative of a sensor condition for the autonomous vehicle. The operations can further include determining a sensor cleaning sequence for the one or more sensor cleaning units on the autonomous vehicle based at least in part on the data indicative of the sensor condition. The operations can further include controlling the one or more sensor cleaning units to sequentially clean the one or more sensors based at least in part on the sensor cleaning sequence.

Another example aspect of the present disclosure is directed to an autonomous vehicle. The autonomous vehicle can include a plurality of sensors and a sensor cleaning system that performs cleaning of the plurality of sensors of the autonomous vehicle. The sensor cleaning system can include a plurality of sensor cleaning units configured to respectively clean the plurality of sensors and a computing system comprising one or more control devices. The computing system can be configured to obtain data indicative of a sensor condition for the autonomous vehicle. The computing system can further be configured to determine a sensor cleaning sequence for one or more of the sensor cleaning units in the plurality based at least in part on the data indicative of the sensor condition. The computing system can further be configured to control the one or more sensor cleaning units to sequentially clean the one or more sensors based at least in part on the sensor cleaning sequence.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
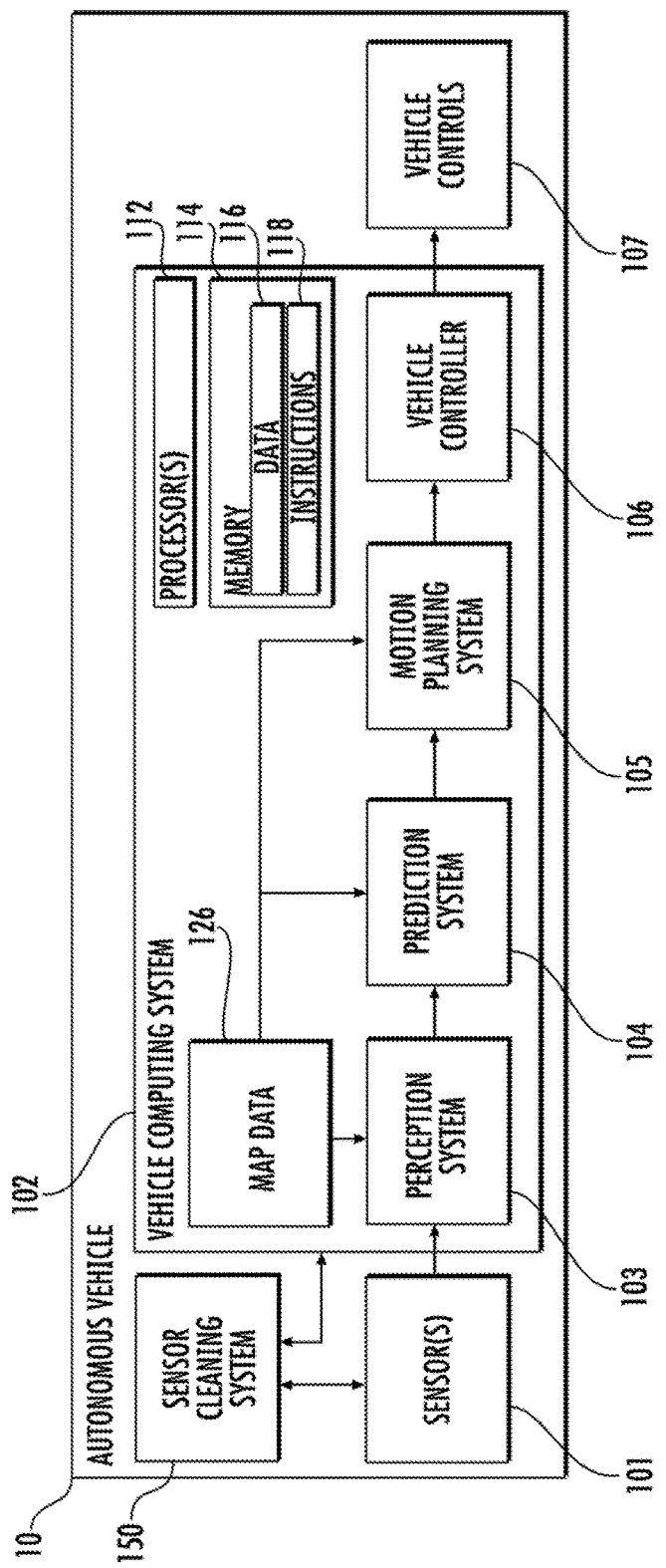
FIG. 1 depicts a block diagram of an example autonomous vehicle according to example embodiments of the present disclosure.

Generally, the present disclosure is directed to systems and methods for cleaning one or more sensors of an autonomous vehicle. For example, the systems and methods of the present disclosure can control a sensor cleaning system based at least in part on data indicative of a sensor condition for the autonomous vehicle. In particular, in some implementations of the present disclosure, a sensor cleaning system can include one or more sensor cleaning units that are configured to respectively clean one or more sensors of the autonomous vehicle. For example, the one or more sensors can include one or more cameras, Light Detection and Ranging (LIDAR) system sensors, Radio Detection and Ranging (RADAR) system sensors, and/or other sensors. Thus, each sensor can have one or more corresponding sensor cleaning units that are configured to clean such sensor, such as, for example, using a fluid (e.g., a gas or a liquid) or a sensor wiper device.

According to example aspect of the present disclosure, in some implementations, the sensor cleaning system can include a computing system, which can include one or more computing devices. The computing system can be configured to control the one or more sensor cleaning units. For example, the computing system can be configured to obtain data indicative of a sensor condition for the autonomous vehicle. The computing system can further be configured to determine a sensor cleaning sequence for the one or more sensor cleaning units based at least in part on the data indicative of a sensor condition. As used herein, the term "sensor cleaning sequence" refers to any plurality of control actions used to cause one or more sensor cleaning units to clean one or more sensors. The computing system can further be configured to control the one or more sensor cleaning units to clean one or more sensors based at least in part on the sensor cleaning sequence.

More particularly, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the autonomous vehicle can include a vehicle computing system that assists in controlling the autonomous vehicle. In particular, in some implementations, the vehicle computing system can receive sensor data from one or more sensors that are coupled to or otherwise included within the autonomous vehicle. As examples, the one or more sensors can include one or more LIDAR sensors, one or more RADAR sensors, one or more cameras (e.g., visible spectrum cameras, infrared cameras, etc.), and/or other sensors. The sensor data can include information that describes the location of objects within the surrounding environment of the autonomous vehicle.

In some implementations, the sensors can be located at various different locations on the autonomous vehicle. As an example, in some implementations, one or more cameras and/or LIDAR sensors can be located in a pod or other structure that is mounted on a roof of the autonomous vehicle while one or more RADAR sensors can be located in or behind the front and/or rear bumper(s) or body panel(s) of the autonomous vehicle. As another example, camera(s) can be located at the front or rear bumper(s) of the vehicle as well. Other locations can be used as well.

The autonomous vehicle can include a sensor cleaning system that cleans the one or more sensors of an autonomous vehicle, such as a fluid cleaning system (e.g., a gas or a liquid). For example, the sensor cleaning system can include a gas cleaning system that cleans the sensors using a gas (e.g., compressed air); a liquid cleaning system that cleans the sensors using a liquid (e.g., windshield washer fluid); or both a gas cleaning system and a liquid cleaning system. In some implementations, the sensor cleaning system can include one or more sensor wiper devices, such as a mechanical device comprising a wiper blade and an actuator configured to move the wiper blade across the sensor in order to clean the sensor.

In particular, in some implementations, the sensor cleaning system can include one or more sensor cleaning units that are configured to respectively clean one or more sensors of the autonomous vehicle. In some implementations, the sensor cleaning units can include gas-based cleaning units that use a gas to clean the sensors. For example, one or more of the gas cleaning units can be an air knife that uses a "knife" of air to clean the sensor. In some implementations, the sensor cleaning units can include liquid-based cleaning units that use a liquid to clean the sensors. For example, one or more of the liquid cleaning units can include a nozzle that sprays the liquid onto the sensor to clean the sensor. In some implementations, a sensor cleaning unit can be configured to clean a sensor using selectively the gas and the liquid. For example, the sensor cleaning unit can include two inflow lines respectively for the gas and the liquid and two different nozzles that respectively spray or otherwise release the gas the liquid. In some implementations, a sensor cleaning unit can be a sensor wiper device that moves a wiper blade over the surface of a sensor to clean the sensor.

As described above, the one or more sensors can include a number of different types of sensors and, in some instances, a given sensor might have a gas cleaning unit, a liquid cleaning unit, and/or a sensor wiper device associated therewith. As one example, in some implementations, each camera and/or LIDAR sensor can have both of a gas cleaning unit and a liquid cleaning unit associated therewith; while each RADAR sensor can have only a liquid cleaning unit associated therewith. Other combinations of sensors and cleaning units can be used as well.

In some implementations, the sensor cleaning system can include both a gas cleaning system and a liquid cleaning system. As an example, in some implementations, a particular sensor can have associated therewith (e.g., physically coupled and/or adjacent thereto) a gas cleaning unit configured to use a gas to clean such sensor and/or a liquid cleaning unit configured to use a liquid to clean such sensor.

According to example aspects of the present disclosure, the sensor cleaning system can include a computing system comprising one or more control devices. The computing system can be configured to obtain data indicative of a sensor condition for the autonomous vehicle. For example, the computing system can be configured to obtain data indicative of a sensor condition for the autonomous vehicle from one or more sensors (e.g., a camera, a precipitation sensor, or a LIDAR sensor), an external weather condition monitoring system, a windshield wiper control device, and/or from other data sources.

Thus, as one example, the computing system can be configured to obtain data indicative of a sensor condition for the autonomous vehicle by obtaining a windshield wiper control signal from a windshield wiper control device of the autonomous vehicle. For example, during operation of the autonomous vehicle, a passenger in the autonomous vehicle may experience difficulty seeing through the windshield of the autonomous vehicle, such as, for example, when the autonomous vehicle is operating in rain or snow conditions. The passenger can operate the windshield wipers on the autonomous vehicle by selecting a windshield wiper operational mode using a windshield wiper control device, such as a windshield wiper control arm located on a steering column of the autonomous vehicle. The computing system can be configured to receive a windshield wiper control signal from the windshield wiper control device, and using the winter wiper control signal, determine a sensor cleaning sequence for one or more sensor cleaning units in the sensor cleaning system.

As another example, in some implementations, the computing system can be configured to determine a precipitation level the autonomous vehicle is operating in based at least in part on a windshield wiper control signal obtained from a windshield wiper control device. For example, during light rain conditions, a passenger may select an intermittent operational mode using the windshield wiper control device. However, during heavy rain conditions, the passenger may select a higher frequency operational mode, such as a continuous operational mode. The computing system can be configured to determine a sensor cleaning sequence for the sensor cleaning system based at least in part on the operational mode selected by a passenger via the windshield wiper control signal.

As yet another example, the computing system can be configured to obtain data indicative of a sensor condition for the autonomous vehicle by obtaining data indicative of a weather condition from a precipitation sensor of the autonomous vehicle. For example, an autonomous vehicle can be equipped with a precipitation sensor, such as a precipitation sensor positioned on a windshield of the autonomous vehicle. The precipitation sensor can be configured to determine that the vehicle is operating in precipitation conditions. For example, the autonomous vehicle may have an automated windshield wiper system wherein the windshield wipers on the autonomous vehicle are operated when the precipitation sensor determines that the autonomous vehicle is operating in rain, snow, or sleet conditions. The computing system can be configured to obtain data indicative of a sensor condition for the autonomous vehicle by receiving data and/or a signal from the precipitation sensor indicative of weather conditions the autonomous vehicle is operating in.

In some implementations, the computing system can be configured to determine a type of precipitation the autonomous vehicle is experiencing based at least in part on the data indicative of a weather condition obtained from a precipitation sensor. For example, a first type precipitation, such as snow, may produce a first signature or pattern when sensed by the precipitation sensor. A second type of precipitation, such as rain, may produce a second signature or pattern when sensed by the precipitation sensor. Similarly, the computing system can be configured to determine an intensity of the weather conditions the autonomous vehicle is operating in based on the data indicative of a weather condition obtained from the precipitation sensor. For example, during light rain conditions, raindrops may produce a first signature or pattern when sensed by the precipitation sensor, whereas during heavy rain conditions, raindrops may produce a second signature or pattern when sensed by the precipitation sensor. In some implementations, the computing system can be configured to determine the type and/or level of the precipitation the autonomous vehicle is operating in based on the data indicative of a weather condition obtained from the precipitation sensor.

As another example source of sensor condition data, the computing system can be configured to obtain data indicative of a sensor condition for the autonomous vehicle by obtaining data indicative of a weather condition from a LIDAR sensor of the autonomous vehicle. For example, during operation of the autonomous vehicle, a LIDAR sensor can be configured to scan the environment around the autonomous vehicle, such as, for example, by emitting light pulses and receiving a reflected light from objects surrounding the autonomous vehicle. In some implementations, the LIDAR sensor can receive reflected light from precipitation, such as rain, snow, and/or sleet. The computing system can be configured to obtain data indicative of a sensor condition for the autonomous vehicle by receiving data indicative of a weather condition from the LIDAR sensor.

As another example, in some implementations, the computing system can be configured to determine a type of precipitation the autonomous vehicle is experiencing based at least in part on the data indicative of a weather condition obtained from a LIDAR sensor. For example, a first type precipitation, such as snow, may produce a first signature or pattern when sensed by the LIDAR sensor. A second type of precipitation, such as rain, may produce a second signature or pattern when sensed by the LIDAR sensor. Similarly, the computing system can be configured to determine a precipitation level the autonomous vehicle is operating in based on the data indicative of a weather condition obtained from the LIDAR sensor. For example, during light rain conditions, raindrops may produce a first signature or pattern when sensed by the LIDAR sensor, whereas during heavy rain conditions, raindrops may produce a second signature or pattern when sensed by the LIDAR sensor. In some implementations, the computing system can be configured to determine the type and/or level of precipitation the autonomous vehicle is operating in based on the data indicative of a weather condition obtained from the LIDAR sensor.

As yet another example, the computing system can be configured to obtain data indicative of a sensor condition for the autonomous vehicle by obtaining data indicative of a weather condition from a weather condition monitoring system external to the autonomous vehicle. For example, a weather condition monitoring system can be configured to receive meteorological data, such as radar data indicative of precipitation, data from weather monitoring stations, such as rain gauges located at airports, or other meteorological data. The computing system can be configured to obtain data indicative of a weather condition the autonomous vehicle is operating in by, for example, obtaining data from the weather condition monitoring system for the geographical area in which the autonomous vehicle is operating. For example, using GPS data, map data, or other data, the computing system can be configured to determine a geographic location of the autonomous vehicle. The computing system can further be configured to communicate with the external weather condition monitoring system to obtain meteorological data for the geographic location in which the autonomous vehicle is located, such as by communicating over a wireless network. In an embodiment, the computing system can be configured to obtain data indicative of forecasted weather conditions for a geographic location in which the autonomous vehicle will be operated at a future point in time, such as, for example, by obtaining data indicative of a weather condition for a planned route of travel for the autonomous vehicle.

According to another aspect of the present disclosure, the computing system can further be configured to determine a sensor cleaning sequence for the one or more sensor cleaning units based at least in part on the data indicative of a sensor condition. For example, the computing system can determine whether one or more of a gas cleaning unit, a liquid cleaning unit, or a sensor wiper device should be used to clean one or more sensors.

The computing system can further be configured to control the one or more sensor cleaning units to clean one or more sensors based at least in part on the sensor cleaning sequence. For example, the computing system can be configured to control each sensor cleaning unit to clean the corresponding sensor according to the sensor cleaning sequence. In some implementations, the sensor cleaning system can include a plurality of flow control devices that respectively control a flow of the fluid (e.g., gas, liquid) to one or more sensor cleaning units. The computing system can control each flow control device to allow the flow of the fluid to the corresponding sensor cleaning unit to enable the corresponding sensor cleaning unit to sequentially clean the corresponding sensor based on the sensor cleaning sequence.

As one example, in some implementations, a sensor cleaning sequence can be plurality of control actions to clean a single sensor, such as cleaning a sensor with a sensor cleaning unit a plurality of times (e.g., according to a frequency). As another example, in some implementations, a sensor cleaning sequence can be a plurality of control actions to clean a plurality of sensors.

In some implementations, a sensor cleaning sequence can be a pattern, such as a pattern that is repeated at certain intervals. In some implementations, a sensor cleaning sequence can be a pattern that is modified in order to preferentially clean one or more sensors. In some implementations, the sensor cleaning sequence can be a pattern that is used to control a plurality of sensor cleaning units. For example, in various implementations, a sensor cleaning sequence can be used to sequentially operate two or more sensor cleaning units. For example, the computing system can sequentially operate two or more sensor cleaning units according to the sensor cleaning sequence, such as by causing a first sensor cleaning unit to clean a first sensor at a first point in time, and causing a second sensor cleaning unit to clean a second sensor at a second point in time. In some implementations, the computing system can further sequentially operate the first sensor cleaning unit to clean the first sensor at a third point in time. For implementations in which an gas cleaning system or a liquid cleaning system are used, cleaning one or more sensors according to a sensor cleaning sequence can help to ensure that sufficient pressure in the sensor cleaning system is available to adequately clean the one or more sensors.

In some implementations, one or more sensors can be preferentially cleaned according to the sensor cleaning sequence. For example, a sensor facing forward along a direction of travel of the autonomous vehicle may be exposed to more precipitation and/or debris than a rear facing sensor. In some implementations, the forward facing sensor can be cleaned at a higher frequency than a rear facing sensor. Similarly, in some operating conditions, a rear facing sensor may be exposed to more precipitation and/or debris than a forward facing sensor, and in such conditions, the rear facing sensor can be cleaned at a higher frequency than the forward facing sensor.

As used herein, the term "frequency" when used in reference to a sensor cleaning sequence can mean a number of times a particular sensor is cleaned in a time period, a number of times a plurality of sensors are cleaned in a time period, a total number of sensors cleaned in a time period, or a number of times that a sensor cleaning control action is performed in a time period.

According to additional aspects of the present disclosure, in some implementations, the sensor cleaning sequence can be determined based at least in part on a speed of the autonomous vehicle. For example, the computing system can be configured to determine a speed of the autonomous vehicle based on one or more autonomous vehicle operating parameters, such as one or more signals from a speedometer, an engine control unit (ECU), GPS data, or other autonomous vehicle operating parameter. The computing system can be configured to determine the sensor cleaning sequence based at least in part on the speed of the autonomous vehicle.

As one example, in some implementations, while a vehicle is operated below a certain speed threshold, forward facing sensors may be exposed to increased precipitation and/or debris as compared to rear facing sensors. In such a situation, the computing system can be configured to control one or more sensor cleaning units associated with the forward facing sensors in order to clean the forward facing sensors at a higher frequency than the rear facing sensors.

Similarly, once the autonomous vehicle is operated above a certain speed threshold, aerodynamic effects may contribute to removing precipitation and/or debris from the forward facing sensors. Moreover, as the autonomous vehicle travels forward, a pressure differential can develop towards the rear of the vehicle, which can cause the rear facing sensors to be exposed to increased precipitation and/or debris. In such a situation, the computing system can be configured to control one or more sensor cleaning units associated with the rear facing sensors in order to clean the rear facing sensors at a higher frequency than the forward facing sensors. Similarly, other sensor cleaning sequences can be determined by a computing system in order to prioritize cleaning of sensors exposed to increased precipitation and/or debris based at least in part on the speed of the vehicle.

According to additional aspects of the present disclosure, in some implementations, the sensor cleaning sequence can be determined based at least in part on a type of weather condition the autonomous vehicle is operating in. For example, a computing system can be configured to determine a type of weather condition the autonomous vehicle is operating in, such as by analyzing data from a precipitation sensor, analyzing data from a LIDAR sensor, receiving data from a weather condition monitoring system, or receiving data indicative of a temperature external to the autonomous vehicle. For example, when a passenger in the autonomous vehicle operates the windshield wipers on the autonomous vehicle by selecting a windshield wiper operational mode using a windshield wiper control device, the computing system can be configured to determine that the autonomous vehicle is experiencing some type of precipitation. The computing system can be further configured to receive data indicative of a temperature external to the autonomous vehicle such as, for example, by receiving a signal from a thermometer or other temperature sensing device. Using one or more temperature thresholds, the computing system can be configured to determine that the precipitation is rain, sleet, or snow. For example, when the temperature is below the freezing point, the computing device can be configured to determine that the precipitation is snow.

The computing system can be configured to determine the sensor cleaning sequence based on the type of weather condition the autonomous vehicle is operating in. For example, when the autonomous vehicle is operated in rain conditions, forward facing sensors may be exposed to more precipitation than rear facing sensors. The computing system can be configured to prioritize cleaning forward facing sensors over rear facing sensors, such as by determining a sensor cleaning sequence in which the forward facing sensors are cleaned at a higher frequency than the rear facing sensors. However, when the autonomous vehicle is operated in snow conditions, the snow may be below a temperature such that the snow does not stick to the forward facing sensors, but due to aerodynamic effects, the snow may accumulate on rear facing sensors. The computing system can be configured to prioritize cleaning rear facing sensors over forward facing sensors, such as by determining a sensor cleaning sequence in which the rear facing sensors are cleaned at a higher frequency than the forward facing sensors.

According to additional aspects of the present disclosure, the computing system can be configured to determine a frequency of the sensor cleaning sequence based at least in part on an operational frequency of one or more windshield wipers of the autonomous vehicle. For example, the computing system can be configured to receive a windshield wiper control signal from a windshield wiper control device. The windshield wiper control signal can include, for example, data indicative of a windshield wiper operational frequency, such as whether the windshield wipers are to be operated in an intermittent or continuous mode and/or data indicative of an operational frequency (i.e., windshield wiper cycles per time period). The computing system can be configured to determine a frequency of the sensor cleaning sequence based at least in part on the operational frequency of the windshield wipers. For example, when the windshield wipers are operated at an intermittent frequency, the frequency of the sensor cleaning sequence can be set at a first frequency. When the windshield wipers are operated at a continuous frequency, the frequency of the sensor cleaning sequence can be set at a second frequency, such as a frequency higher than the first frequency. Additional sensor cleaning sequence frequencies can be determined based on additional windshield wiper frequencies. In some implementations, the frequency of the sensor cleaning sequence can be a frequency that is higher than the operational frequency of the windshield wipers. In this way, the computing system can determine a frequency of the sensor cleaning sequence based at least in part on an operational frequency of one or more windshield wipers of the autonomous vehicle.

According to additional aspects of the present disclosure, the computing system can further be configured to obtain data from one or more sensors and determine a sensor cleaning sequence based at least in part on the sensor data. For example, a sensor, such as a camera or LIDAR sensor, can be configured to collect sensor data that describes the surrounding environment or other aspects of the autonomous vehicle. The computing system (either alone or in combination with other components or systems of the autonomous vehicle) can analyze the collected sensor data (e.g., camera data or LIDAR data) to assess whether the sensor should be prioritized for cleaning in the sensor cleaning sequence.

As one example, the one or more sensors can include a camera that collects imagery and the sensor cleaning system can determine that the camera requires cleaning based at least in part on one or more characteristics of the imagery captured by the camera. As examples, the computing system can determine that the camera requires cleaning based at least in part on at least one of a sharpness and a brightness of at least a portion of a frame included in imagery captured by the camera. For example, if the sharpness, brightness, and/or other characteristic(s) fall below respective threshold value(s), then it can be determined that the camera requires cleaning and should be prioritized in the sensor cleaning sequence. As another example, if the sharpness, brightness, and/or other characteristic(s) decline or otherwise worsen over a number of frames or over time, then it can be determined that the camera requires cleaning. As yet another example, if the sharpness, brightness, and/or other characteristic(s) of a first portion of a frame of imagery captured by the camera are significantly worse than the sharpness, brightness, and/or other characteristic(s) of a second portion of the same frame of imagery, then it can be determined that the camera requires cleaning, and the computing system can prioritize cleaning the camera in the sensor cleaning sequence.

In yet another example, the computing system can detect an occlusion exhibited at a same location in a plurality of frames captured by a camera. For example, a patch of dirt might have accumulated on the camera lens, thereby occluding the camera's field of view over a number of frames of imagery. In response, the computing system can determine that the camera requires cleaning and prioritize cleaning the camera in the sensor cleaning sequence.

As another example, in some implementations, to determine that one or more sensors require cleaning, the computing system can detect a disappearance of an observed object. As an example, if the autonomous vehicle continuously observes a pedestrian over a period of sensor data collection and processing iterations, and then suddenly the pedestrian is no longer observed based on the sensor data, it can be assumed that one or more of the sensors that collected the corresponding sensor data require cleaning. For example, a splash from a mud puddle can have obscured a camera lens, thereby causing the pedestrian to disappear from the sensor data collected by the corresponding camera. In response, the computing system can determine that the camera requires cleaning and prioritize cleaning the camera in a sensor cleaning sequence.

As another example, to determine that one or more sensors require cleaning, the computing system can detect an absence of an object that is expected to be observed. As an example, an autonomous vehicle can be located at a known location at which the autonomous vehicle would expect, for example based on map data, to observe a stoplight. However, if the autonomous vehicle does not observe the stoplight at the expected location, then it can be assumed that one or more of the sensors that would be expected to collect sensor data indicative of the expected object require cleaning. For example, an accumulation of dirt may cause a camera to have an obscured field of view and, therefore, fail to observe the stoplight. In response, the computing system can determine that the camera requires cleaning and prioritize cleaning the camera in the sensor cleaning sequence.

As another example, in some implementations, the computing system can detect a lens flaring effect caused by an accumulation of fluid on the lens of a sensor. For example, if the autonomous vehicle is operated during night in rainy conditions, rain can accumulate on the lens of the camera. As the autonomous vehicle passes underneath a light source, individual rain droplets on the camera lens can flare the light source, causing a lens flaring effect. This can temporarily reduce the effectiveness of the camera due to the lens flaring effect. In some implementations, the computing system can be configured to detect the presence of the rain droplets based on the lens flaring effect, and can be configured to prioritize cleaning of the camera prior to the autonomous vehicle passing underneath an intense light source in order to minimize the lens flaring effect.

As another example, in some implementations, the computing system can determine a LIDAR or RADAR sensor should be cleaned based on a stretching effect. For example, a LIDAR sensor can be configured to detect the presence of a static image, such as a stop sign. However, when a fluid, such as one or more rain droplets, accumulates on the LIDAR sensor, the static object can be stretched as the reflected light signal is pulled through the fluid as the sensor rotates. The computing system can be configured to detect the stretched static image, and determine that the LIDAR sensor should be prioritized for cleaning in the sensor cleaning sequence.

Thus, in some implementations, the computing system can obtain sensor data from a sensor, and determine the sensor cleaning sequence based at least in part on the sensor data. In this way, the computing system can prioritize cleaning of sensors that require cleaning.

According to additional aspects of the present disclosure, the computing system can be configured to obtain a windshield wiper fluid spray signal from a windshield wiper control device. In some implementations, the computing system can control one or more liquid cleaning units to clean one or more sensors based upon the windshield wiper fluid spray signal. For example, during operation, an autonomous vehicle may pass through a mud puddle, thereby splashing mud on the windshield and one or more sensors. A passenger riding in the autonomous vehicle may press a windshield wiper fluid spray switch on a windshield wiper control device in order to spray the windshield with windshield wiper fluid in order to remove the mud. In some implementations, the computing system can be configured to control one or more liquid cleaning units in the sensor cleaning system based on the windshield wiper fluid spray signal to clean one or more sensors with a liquid in order to remove any mud that may have accumulated on the one or more sensors.

According to additional aspects of the present disclosure, computing system can be configured to subsequently clean a sensor with a gas cleaning unit after the sensor has been cleaned with a liquid cleaning unit. For example, during operation, the computing system may determine that a patch of dirt has accumulated on a camera lens, thereby occluding the camera's field of view over a number of frames of imagery. The computing system can control a liquid cleaning unit in order to spray liquid onto the camera lens in order to remove the dirt. However, the liquid may also need to be removed for proper operation of the sensor. The computing system can further be configured to control a gas cleaning unit in order to spray air onto the camera lens in order to remove the liquid.

The systems and methods described herein may provide a number of technical effects and benefits. For example, a sensor cleaning system can be configured to obtain data indicative of a sensor condition, and based on the data, determine a sensor cleaning sequence to control one or more sensor cleaning units to sequentially clean one or more sensors. This can allow for the removal of precipitation and/or debris from the one or more sensors during operation of the autonomous vehicle, thereby enabling the one or more sensors to operate properly. Improved performance of the one or more sensors can lead to improved performance of the autonomous vehicle motion control, which relies upon data collected by the one or more sensors to comprehend the surrounding environment of the autonomous vehicle. Thus, the improved and intelligent sensor cleaning systems of the present disclosure can directly improve autonomous vehicle performance such as efficiency, safety, and passenger comfort. Further, example aspects of the present disclosure can provide for more efficient processing of data, by, for example, allowing for the use of a variety of data indicative of a sensor condition to be used to control operation of the sensor cleaning system.

Moreover, the systems and methods described herein can allow for additional inputs, such as vehicle speed, precipitation type, sensor data, or other inputs, to be used to prioritize cleaning of the one or more sensors in order to further improve the operation of the one or more sensors. For example, sensors that are exposed to increased precipitation and/or debris during certain operating conditions or that are identified as needing cleaning in a data analysis process can be prioritized for cleaning in a sensor cleaning sequence. Additionally, by using a sensor cleaning sequence, adequate pressure levels can be maintained for proper operation of liquid and gas cleaning systems while still providing sufficient cleaning for one or more sensors on an autonomous vehicle. This can allow for smaller components to be used in a sensor cleaning system, thereby reducing the weight and cost of such a system. In this way, the systems and methods according to the present disclosure can allow for one or more sensors on an autonomous vehicle to be cleaned based on sensor conditions for the autonomous vehicle, thereby improving reliability and allowing for safer operation of the autonomous vehicle.

With reference now to the FIGS., example aspects of the present disclosure will be discussed in further detail. FIG. 1 depicts a block diagram of an example autonomous vehicle 10 according to example embodiments of the present disclosure. The autonomous vehicle 10 is capable of sensing its environment and navigating with little to no human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a sensor cleaning system 150, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

According to an aspect of the present disclosure, the autonomous vehicle 10 can further include the sensor cleaning system 150. In particular, in some implementations, the sensor cleaning system 150 can include a plurality of sensor cleaning units that are configured to respectively clean a plurality of sensors 101 of the autonomous vehicle 10 using a fluid (e.g., a gas or a liquid) or a sensor wiper device. Thus, the sensor cleaning system 150 can include a gas cleaning system (also referred to as a pneumatic cleaning system) that cleans the sensors 101 using a gas (e.g., compressed air); a liquid cleaning system (also referred to as a hydraulic cleaning system) that cleans the sensors 101 using a liquid (e.g., windshield washer fluid); both the gas cleaning system and the liquid cleaning system; or one or more mechanical sensor wiper devices.

According to one aspect of the present disclosure, in some implementations, the sensor cleaning system 150 can provide individualized cleaning of the sensors 101 of the autonomous vehicle 10. For example, one or more computing devices of the sensor cleaning system 150 can individually control the flow of a corresponding fluid to each sensor cleaning unit to enable individualized cleaning of the sensors 101. In some implementations, the one or more computing devices of the sensor cleaning system can obtain data indicative of a sensor condition for the autonomous vehicle, such as a windshield wiper control signal, a signal from a precipitation sensor, data from a LIDAR sensor, and data from an external weather condition monitoring system. In addition, in some implementations, the one or more computing devices can determine whether each sensor 101 requires cleaning based at least in part on the respective sensor data collected by each sensor 101. In some implementations, the one or more computing devices of the sensor cleaning system 150 can determine a sensor cleaning sequence, and control the one or more sensor cleaning units or sensor wiping devices to clean one or more sensors 101 according to the sensor cleaning sequence. In some instances, the sensor cleaning system 150 can determine whether each sensor 101 requires cleaning based at least in part on data (e.g., object state data) and/or other information received from the vehicle computing system 102 (e.g., from the perception system 103), and can determine the sensor cleaning sequence based on the sensor data. In some implementations, the sensor cleaning sequence can be determined based at least in part on a speed of the autonomous vehicle 10, a type of weather condition the autonomous vehicle 10 is operating in, or an operational frequency of one or more windshield wipers of the autonomous vehicle 10. The cleaning of sensors 101 according to a sensor cleaning sequence can improve the efficiency of the cleaning system 150 and eliminate instances in which all of the sensors 101 are simultaneously cleaned, thereby eliminating instances in which the entire sensor system is temporarily "blinded."

According to another aspect of the present disclosure, in some implementations, the sensor cleaning system 150 can include both a gas cleaning system and a liquid cleaning system. As an example, in some implementations, a particular sensor 101 can have associated therewith (e.g., physically coupled and/or adjacent thereto) a gas cleaning unit configured to use a gas to clean such sensor and/or a liquid cleaning unit configured to use a liquid to clean such sensor 101.

As such, according to yet another aspect of the present disclosure, in some implementations, the liquid cleaning system can be pressurized or otherwise powered by the gas cleaning system or other gas system. In particular, in some implementations, the sensor cleaning system 150 can include a pressure transfer device that uses a first volume of a gas to pressurize the liquid used by the liquid cleaning system. Use of the gas cleaning system to pressurize the liquid cleaning system enables the use of liquids at much higher pressures than can be achieved by alternative liquid cleaning systems that rely upon, for example, a pump to provide the flow of liquid to the liquid cleaning units.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
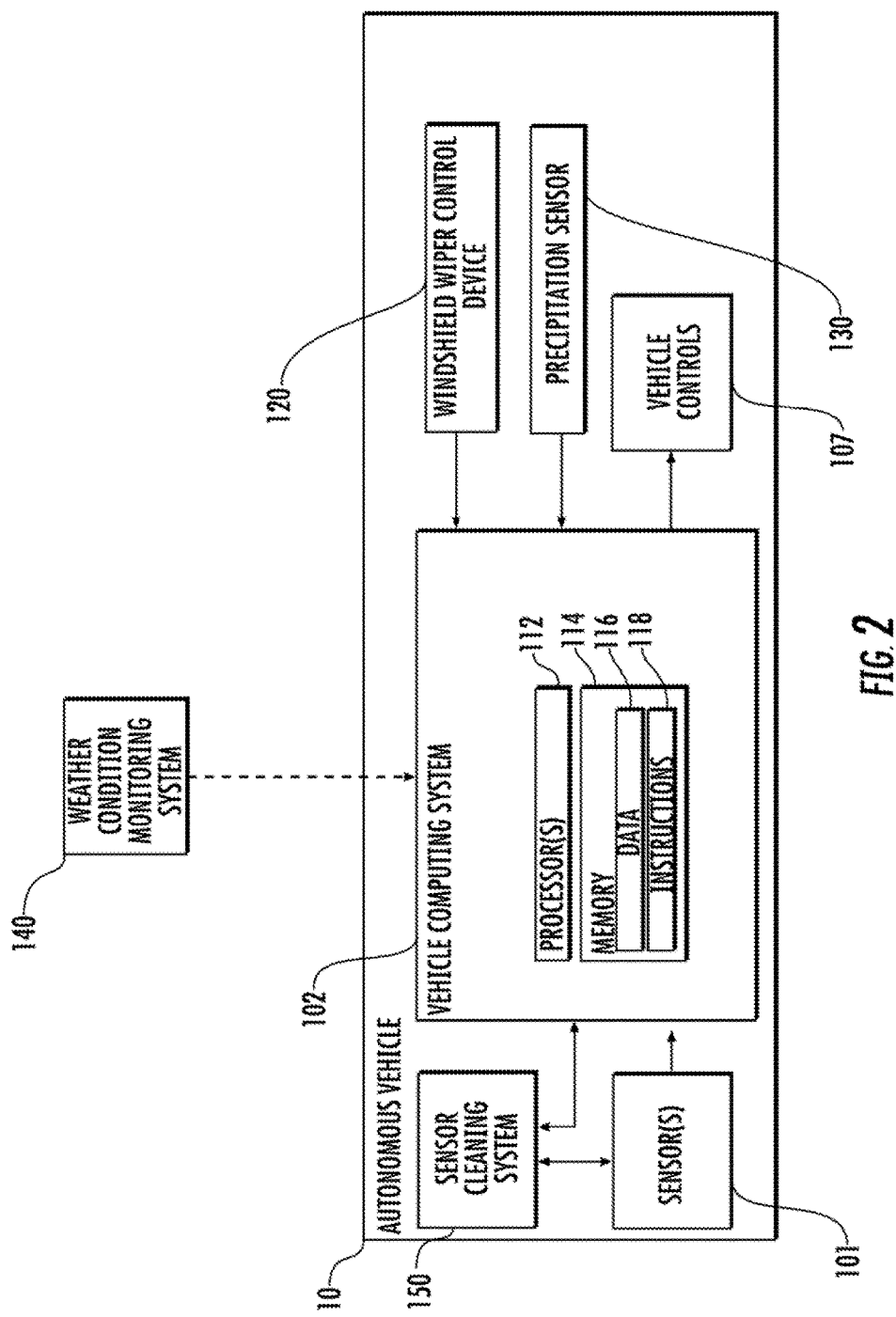
FIG. 2 depicts a block diagram of an example autonomous vehicle according to example embodiments of the present disclosure.

FIG. 2 depicts a block diagram of an example autonomous vehicle 10 according to example embodiments of the present disclosure. Elements that are the same or similar to those of FIG. 1 are referred to with the same reference numerals. As shown, an autonomous vehicle 10 can include one or more sensors 101 and a sensor cleaning system 150. The autonomous vehicle 102 can further include a vehicle computing system 102, which can be configured to receive data from the one or more sensors 101. Further, the vehicle computing system 102 can be configured to control the sensor cleaning system 150 to clean the one or more sensors 101.

In some implementations, the vehicle computing system 102 can be configured to obtain data indicative of a sensor condition for the autonomous vehicle. For example, in some implementations, the vehicle computing system 102 can be configured to obtain a windshield wiper control signal from a windshield wiper control device 120 of the autonomous vehicle 10. The windshield wiper control device 120 can be, for example, a windshield wiper control arm located on a steering column of the autonomous vehicle 10. The windshield wiper control device 120 can be configured to control one or more windshield wipers of the autonomous vehicle 10 by, for example, sending one or more control signals to one or more actuators associated with the windshield wipers, thereby controlling the windshield wipers to wipe the windshield. In some implementations, the windshield wiper control device can be configured to receive a user input, such as by a user selecting a windshield wiper frequency on the windshield wiper control device 120. For example, during light rain conditions, a user may select an intermittent windshield wiper setting on the windshield wiper control device 120, whereas during heavy rain conditions, the user may select a continuous windshield wiper frequency on the windshield wiper control device 120.

In some implementations, the vehicle computing system 102 can be configured to obtain a windshield wiper control signal from the windshield wiper control device 120. Further, the vehicle computing system 102 can be configured to control one or more sensor cleaning units in the sensor cleaning system 150 to clean one or more sensors 101 based at least in part on the windshield wiper control signal from the windshield wiper control device 120.

For example, in some implementations, the vehicle computing system 102 can determine a sensor cleaning sequence for one or more sensor cleaning unit to the autonomous vehicle 10 based at least in part on the windshield wiper control signal. For example, the vehicle computing system 102 can determine a frequency of a sensor cleaning system 150 based at least in part on the windshield wiper control signal. For example, when a user selects an intermittent frequency for the windshield wipers, the vehicle computing system 102 can select a first frequency for a sensor cleaning sequence to clean one or more sensors 101 with the sensor cleaning system 150, whereas when a user selects a continuous frequency for the windshield wipers, the vehicle computing system 102 can select a second frequency (e.g., a higher frequency) for a sensor cleaning sequence to clean the one or more sensors 101.

In some implementations, the vehicle computing system 102 can be configured to obtain data indicative of a sensor condition for the autonomous vehicle 10 by obtaining data indicative of a weather condition from a precipitation sensor 130 of the autonomous vehicle 10. For example, an autonomous vehicle 10 can be equipped with a precipitation sensor 130, which can be configured to sense when the autonomous vehicle 10 is operated in precipitation. For example, an autonomous vehicle 10 may include an automatic windshield wiper control system, which can include a precipitation sensor 130 positioned on a windshield of the autonomous vehicle 10. The precipitation sensor 130 can be configured to determine when the autonomous vehicle 10 is being operated in precipitation, such as rain, snow, or sleet, and the automatic windshield wiper control system can be configured to operate one or more windshield wipers based on signals received from the precipitation sensor 130.

In some implementations, the vehicle computing system 102 can receive data indicative of a weather condition from the precipitation sensor 130, and can further determine a sensor cleaning sequence based at least in part on the data obtained from the precipitation sensor 130. For example, in some implementations, the vehicle computing system 102 can be configured to determine a type of precipitation the autonomous vehicle 10 is operated in based at least in part on the data indicative of a weather condition obtained from the precipitation sensor 130. For example, a first type precipitation, such as snow, may produce a first signature or pattern when sensed by the precipitation sensor 130. A second type of precipitation, such as rain, may produce a second signature or pattern when sensed by the precipitation sensor 130. Similarly, the vehicle computing system 102 can be configured to determine an intensity of the weather conditions the autonomous vehicle 10 is operating in based on the data indicative of a weather condition obtained from the precipitation sensor 130. For example, during light rain conditions, raindrops may produce a first signature or pattern when sensed by the precipitation sensor 130, whereas during heavy rain conditions, raindrops may produce a second signature or pattern when sensed by the precipitation sensor 130. In some implementations, the vehicle computing system 102 can be configured to determine the type and/or level of the precipitation the autonomous vehicle 10 is operating in based on the data indicative of a weather condition obtained from the precipitation sensor 130. The vehicle computing system 102 can be configured to determine a sensor cleaning sequence for the sensor cleaning system 150 such as, for example, by determining which sensors 101 to clean and/or a frequency of sensor cleaning based on the type and/or intensity of precipitation sensed by a precipitation sensor 130.

In some implementations, the vehicle computing system 102 can be configured to determine a sensor cleaning sequence based on data indicative of a weather condition obtained from a LIDAR sensor of the autonomous vehicle 10. For example, during operation of the autonomous vehicle 10, a LIDAR sensor can be configured to scan the environment around the autonomous vehicle 10, such as, for example, by emitting light pulses and receiving a reflected light from objects surrounding the autonomous vehicle 10. In some implementations, the LIDAR sensor can receive reflected light from precipitation, such as rain, snow, and/or sleet. The vehicle computing system 102 can be configured to obtain data indicative of a weather condition the autonomous vehicle 10 is operating in by receiving data indicative of a weather condition from the LIDAR sensor.

For example, in some implementations, the data indicative of a weather condition can be a reflection pattern or a point cloud pattern that is representative of the weather condition. As examples, the vehicle computing system 102 can be configured to determine a precipitation type or precipitation level the autonomous vehicle 10 is operating in based at least in part on the data indicative of a weather condition obtained from the LIDAR sensor. As used herein, the term "precipitation type" refers to a classification of precipitation in which an autonomous vehicle is operating (e.g., rain, snow, sleet, freezing rain, etc.). For example, a first type precipitation, such as snow, may produce a first point cloud pattern or reflection pattern when sensed by the LIDAR sensor. A second type of precipitation, such as rain, may produce a second point cloud pattern or reflection pattern when sensed by the LIDAR sensor. Similarly, the vehicle computing system 102 can be configured to determine a precipitation level the autonomous vehicle 10 is operating in based on the data indicative of a weather condition obtained from the LIDAR sensor. As used herein, the term "precipitation level" refers to a relative amount or intensity of precipitation in which an autonomous vehicle is operating (e.g., light, steady, intermittent, heavy, etc.). For example, during light rain conditions, raindrops may produce a first point cloud pattern or reflection pattern when sensed by the LIDAR sensor, whereas during heavy rain conditions, raindrops may produce a second point cloud pattern or reflection pattern when sensed by the LIDAR sensor. The vehicle computing system 102 can be configured to determine a sensor cleaning sequence for the sensor cleaning system 150 such as, for example, by determining which sensors to clean and/or a frequency of sensor cleaning based on the precipitation type and/or precipitation level the autonomous vehicle 10 is operating in based on the data indicative of a weather condition obtained from the LIDAR sensor.

In some implementations, the vehicle computing system 102 can be configured to determine a sensor cleaning sequence based on data indicative of a weather condition obtained from weather condition monitoring system 140 external to the autonomous vehicle 10. For example, a weather condition monitoring system 140 can be configured to receive meteorological data, such as radar data indicative of precipitation, data from weather monitoring stations, such as rain gauges located at airports, or other meteorological data. The vehicle computing system 102 can be configured to obtain data indicative of a weather condition the autonomous vehicle 10 is operating in by, for example, obtaining data from the weather condition monitoring system 140 for the geographical area in which the autonomous vehicle 10 is operating. For example, using GPS data, map data, or other data, the vehicle computing system 102 can be configured to determine a geographic location of the autonomous vehicle 10. The vehicle computing system 102 can further be configured to communicate with the external weather condition monitoring system 140 to obtain meteorological data for the geographic location in which the autonomous vehicle 10 is located, such as by communicating over a wireless network. In some implementations, the vehicle computing system 102 can be configured to obtain data indicative of forecasted weather conditions for a geographic location in which the autonomous vehicle 10 will be operated at a future point in time, such as, for example, by obtaining data indicative of a weather condition for a planned route of travel for the autonomous vehicle 10. The vehicle computing system 102 can be configured to determine a sensor cleaning sequence for the sensor cleaning system 150 such as, for example, by determining which sensors to clean and/or a frequency of sensor cleaning based on the type and/or intensity of precipitation the vehicle is operating in based on the data indicative of a weather condition obtained from the weather condition monitoring system 140.

As noted, the vehicle computing system 102 can obtain sensor data from one or more sensors 101. In some implementations, the vehicle computing system 102 can determine the sensor cleaning sequence based at least in part on sensor data from the one or more sensors 101. For example, as described herein, sensor data from one or more sensors 101 (e.g. imagery data from one or more cameras, LIDAR data from one or more LIDAR sensors) can indicate a particular sensor 101 should be prioritized for cleaning. In some implementations, the vehicle computing system 102 can prioritize a particular sensor 101 for cleaning in a sensor cleaning sequence.

In some implementations, the vehicle computing system 102 can be configured to obtain additional data, such as data indicative of a speed of the autonomous vehicle 10 (e.g., ECU data, GPS data, speedometer data), data indicative of a weather condition in the autonomous vehicle is operating in (e.g., temperature data from one or more temperature sensors), windshield wiper operational frequency data (e.g., windshield wiper control device setting), or other data as described herein. In some implementations, the vehicle computing system 102 can determine a sensor cleaning sequence based at least in part on such data.

Figure 3:
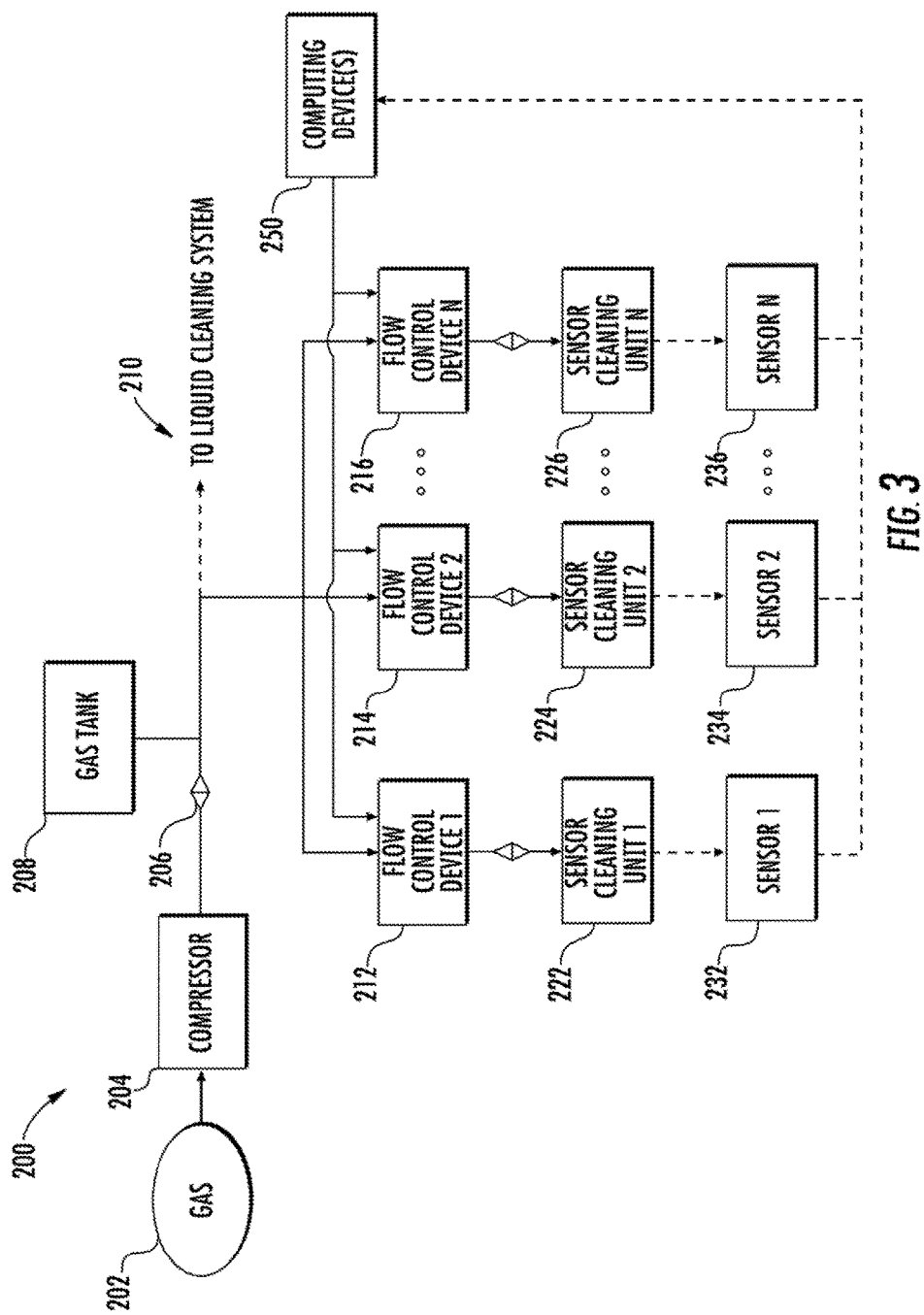
FIG. 3 depicts a block diagram of an example gas-based sensor cleaning system according to example embodiments of the present disclosure.

FIG. 3 depicts a block diagram of an example gas-based (i.e., pneumatic) sensor cleaning system 200 according to example embodiments of the present disclosure. The gas-based sensor cleaning system 200 can optionally be included in the sensor cleaning system 150 of FIG. 1.

The gas-based sensor cleaning system 200 of FIG. 2 includes a compressor 204. The compressor 204 can compress a gas 202. For example, the gas 202 can be ambient air external to the autonomous vehicle. In some implementations, the compressor 204 can be mounted on a platform that is underneath the autonomous vehicle carriage. For example, the platform can be physically coupled to the autonomous vehicle chassis.

Pressurized gas from the compressor 204 can pass through a valve 206 (e.g., a one-way check valve) and can be stored in a gas tank 208. For example, the gas tank 208 can be a gas accumulator. In some implementations, the pressurized gas can also optionally be routed to assist in gas-pressurizing a liquid cleaning system, as shown at 210.

The gas-based sensor cleaning system 200 can also include a plurality of sensor cleaning units, as shown at 222, 224, and 226. Although three sensor cleaning units 222-226 are shown, any number of units can be included in the system 200. Each sensor cleaning unit 222-226 can use the pressurized gas to clean a respective sensor, as shown at 232, 234, and 236. For example, each sensor cleaning unit 222-226 can blow or otherwise release the gas onto the sensor (e.g., a lens, cover, housing, or other portion of the sensor) to remove contaminants or other debris from the sensor (e.g., from the lens, cover, housing, or other portion of the sensor).

In some implementations, one or more of the sensor cleaning units 222-226 can be an air knife that uses a "knife" of air to clean the corresponding sensor 236. For example, each air knife can include a narrow slit though which the pressurized gas is forced. In one example, the pressurized gas can travel through the narrow slit at a pressure of 80 PSI. In some implementations, each air knife can be integral to the corresponding sensor. In some implementations, each air knife can be positioned such that the pressurized gas is released perpendicular to the corresponding sensor and then sweeps over a face of the sensor due to fluid dynamics.

The gas-based sensor cleaning system 200 can also include a plurality of flow control devices, as shown at 212, 214, and 216. The flow control devices 212-216 can respectively control a flow of the pressured gas from the compressor 204 and/or the gas tank 208 to the plurality of sensor cleaning units 222-226.

The sensor cleaning system 200 can further include one or more computing devices 250. The one or more computing devices 250 can individually control each flow control device 212-216 to allow the flow of the pressurized gas to the corresponding sensor cleaning unit 222-226 to enable the corresponding sensor cleaning unit 222-226 to individually clean the corresponding sensor 232-236. In some implementations, the one or more computing devices 250 can also control the compressor 204.

The one or more computing devices 250 can include one or more control devices, units, or components that interface with or otherwise control the one or more flow control devices 212-216. As examples, a computing device 250 can include one or more chips (e.g., ASICs or FPGAs), expansion cards, and/or electronic circuitry (e.g., amplifiers, transistors, capacitors, etc.) that are organized or otherwise configured to control one or more flow control devices (e.g., by way of control signals). In some implementations, a computing device 250 can include a processor that loads and executes instructions stored in a computer-readable media to perform operations.

In some implementations, the one or more computing devices 250 include a single computing device. In some implementations, the one or more computing devices 250 include a plurality of computing devices that respectively control the plurality of flow control devices 212-216. In some implementations, the one or more computing devices 250 can be physically located on a control board. For example, the control board can be physically coupled to a flow control device manifold, as described below.

In some implementations, the plurality of flow control devices 212-216 can include a plurality of solenoids that are individually controllable by the one or more computing devices 250 to respectively allow or disallow the flow of the pressurized gas to the corresponding sensor cleaning unit 222-226. That is, the one or more computing devices 250 can individually control each solenoid to control the respective flow of gas to the corresponding sensor cleaning unit 222-226 according to a sensor cleaning sequence, thereby enabling cleaning of each sensor 232-236 based at least in part on the sensor cleaning sequence.

In some implementations, the one or more computing devices 250 can determine a sensor cleaning sequence based at least in part on data indicative of a sensor condition. For example, in one or more implementations, the one or more computing devices 250 can obtain data indicative of a sensor condition from a windshield wiper control device, a precipitation sensor, a LIDAR sensor, one or more sensors configured to obtain sensor data, and/or an external weather condition monitoring system. The one or more computing devices 250 can determine a sensor cleaning sequence based at least in part on the data indicative of the sensor condition. For example, a windshield wiper control signal can indicate that precipitation is falling, or sensor data can indicate that a particular sensor of the plurality of sensors 232-236 requires cleaning. The one or more computing devices 250 can determine the sensor cleaning sequence based at least in part on the data indicative of a sensor condition.

Further, in some implementations, the one or more computing devices 250 can determine the sensor cleaning sequence based at least in part on a speed of the autonomous vehicle 10, a type of weather condition autonomous vehicle 10 is operating in, or an operational frequency of one or more windshield wipers of the autonomous vehicle 10. For example, a frequency of a sensor cleaning sequence can be based on a windshield wiper operational frequency, such as a continuous or intermittent operational frequency.

In some implementations, the one or more computing devices 250 can cooperatively operate with one or more vehicle systems to determine the sensor cleaning sequence. For example, the one or more computing devices 250 can obtain data indicative of a weather condition from an external weather condition monitoring system for a route planned by the motion planning system 105, and can determine the sensor cleaning system based on the data indicative of the weather condition. In some implementations, the one or more computing devices 250 can obtain data from one or more vehicle systems, such as temperature data from a temperature sensor of the autonomous vehicle, or a vehicle speed from a vehicle controller, engine control unit, GPS data, speedometer, or other speed determining system or device, and use the data to determine the sensor cleaning sequence.

In some implementations, a sensor cleaning sequence can be a pattern, such as a pattern that is repeated at certain intervals. In some implementations, a sensor cleaning sequence can be a pattern that is modified in order to preferentially clean one or more sensors 232-236. In some implementations, the sensor cleaning sequence can be a pattern that is used to control a plurality of sensor cleaning units 222-226. In some implementations, the sensor cleaning sequence can be a pattern or frequency of cleaning an individual sensor 232-236 with an associated sensor cleaning unit 222-226.

In some implementations, the sensor cleaning sequence can include cleaning a sensor 232-236 with a gas sensor cleaning unit 222-226 following cleaning a sensor 232-236 with a liquid sensor cleaning unit, as described herein.

In some implementations, one or more sensors 232-236 can be preferentially cleaned according to the sensor cleaning sequence. For example, a sensor 232-236 facing forward along a direction of travel of the autonomous vehicle may be exposed to more precipitation and/or debris than a rear facing sensor 232-236. In some implementations, the forward facing sensor 232-236 can be cleaned at a higher frequency than a rear facing sensor 232-236. Similarly, in some operating conditions, a rear facing sensor 232-236 may be exposed to more precipitation and/or debris than a forward facing sensor 232-236, and in such conditions, the rear facing sensor 232-236 can be cleaned at a higher frequency than the forward facing sensor 232-236.

In some implementations, the one or more computing devices 250 can actively (e.g., periodically, continuously, or near-continuously) assess a respective contamination status of each sensor 232-236 and determine, based on such contamination status, when a particular sensor 232-236 requires cleaning. In response to a determination that a particular sensor 232-236 requires cleaning, the one or more computing devices 250 can prioritize the sensor 232-236 for cleaning in a sensor cleaning sequence, and further control a particular flow control device 212-216 that corresponds to such particular sensor 232-236 to allow the flow of the pressurized gas to the corresponding sensor cleaning unit 222-226 to enable the corresponding sensor cleaning unit 222-226 to clean the particular sensor 232-236 based on the sensor cleaning sequence.

According to another aspect of the present disclosure, in some implementations, the sensor cleaning system 200 can determine whether each sensor 232-236 requires cleaning based at least in part on the respective sensor data collected by each sensor 232-236. In particular, each sensor 232-236 can collect sensor data that describes the surrounding environment or other aspects of the autonomous vehicle. The one or more computing devices 250 (either alone or in combination with other components or systems of the autonomous vehicle) can analyze the collected sensor data to assess the respective contamination status of each sensor 232-236. Thus, a feedback control loop can use the data collected by the sensor 232-236 to determine the cleaning requirement status of the sensor 232-236, and prioritize a sensor 232-236 that requires cleaning for cleaning in the sensor cleaning sequence.

In some implementations, the sensor cleaning system 200 can cooperatively operate with various components of the autonomous vehicle (e.g., a perception system of the autonomous vehicle) to perform sensor contamination status detection based on the presence and/or absence of environmental objects observed by the autonomous vehicle in furtherance of its autonomous driving.

Cleaning of sensors according to a sensor cleaning sequence can improve the efficiency of the sensor cleaning system 200. For example, the sensor cleaning system 200 can prioritize cleaning particular sensors 232-236 in a sensor cleaning sequence that have been identified as requiring cleaning, rather than cleaning all sensors 232-236 periodically regardless of contamination status. As another example, the sensor cleaning system 200 can prioritize cleaning front-facing sensors more often than rear-facing sensors, or vice-versa, based on the sensor cleaning sequence. For example, in some operating conditions, front-facing sensors may experience increased accumulation of precipitation, dirt, dust, road salt, organic matter (e.g., "bug splatter," pollen, bird droppings, etc.), or other contaminants, while in other operating conditions, rear-facing sensors may experience increased accumulation of these contaminants. Cleaning sensors according to a sensor cleaning sequence based on precipitation type, precipitation intensity, individual contamination of a sensor, vehicle speed, windshield wiper frequency, etc. can allow for prioritizing cleaning of sensors likely to or that actually have experienced increased accumulation of contaminants, thereby more efficiently using energy and gas resources and reducing "wear and tear" on the sensor cleaning units 222-226. Further, by cleaning sensors 232-236 according to a sensor cleaning sequence, the pressure of the gas from the compressor 204 can be managed, helping to ensure that sufficient pressure is maintained to allow for adequate cleaning of the sensors 232-236.

Cleaning of sensors according to a sensor cleaning sequence can also improve the performance of the corresponding sensors 232-236. For example, sensors experiencing increased accumulation of precipitation or debris can be prioritized for cleaning in a sensor cleaning sequence, and by cleaning one or more sensors sequentially, instances in which the all of the sensors 232-236 are simultaneously cleaned and therefore the entire sensor system is temporarily "blinded" can be eliminated. Eliminating such instances of blinding results in better overall sensor data quality. In addition, cleaning of sensors according to a sensor cleaning sequence can allow for the prioritization of cleaning a particular sensor 232-236 once it is recognized that a sensor 232-236 requires cleaning. Such is in contrast to periodic sensor cleaning techniques where a sensor that requires cleaning may remain contaminated until the next scheduled sensor cleaning or until the next instance in which all sensors can safely be simultaneously cleaned.

According to another aspect, in some implementations, two or more of the plurality of flow control devices 212-216 (e.g., solenoids) can be included in a manifold (e.g., a solenoid manifold) or other combined structure. In some implementations, one or more of the flow control device manifolds (e.g., solenoid manifolds) can be integrated with the gas tank 208. As an example, a solenoid manifold that controls the respective flow of the pressurized gas to the sensor cleaning units 222-226 can be physically located within a pressurized volume of the gas stored by a gas tank 208. In some implementations, the one or more computing devices 250 can also be integrated with the gas tank 208. For example, the one or more computing devices 250 can be physically located on a control board that is physically coupled to the flow control device manifold.

Inclusion of the flow control device manifold within the gas tank 208 enables such components to be provided as a single package, thereby saving space. Inclusion of the flow control device manifold within the gas tank 208 also decreases the respective gas flow distances from the tank 208 to the sensor cleaning units 222-226, thereby eliminating pressure loss due to hose length and, conversely, increasing pressure of the gas when used by the sensor cleaning units 222-226.

In addition, in some implementations, the integrated gas tank can further include valves, a humidity sensor, a pressure sensor, and/or controls coupled thereto or otherwise integrated therewith.

In some implementations, an entirety of the sensor cleaning system 200 exclusive of wiring is physically located external to a cab of the autonomous vehicle. As one example, the compressor 204 can be located on a platform underneath the vehicle while all other components, including the tank 208, flow control devices 212-216, and sensor cleaning units 222-226 are located on a roof of the vehicle (e.g., in a pod mounted on the roof of the vehicle). As another example, the compressor 204 and/or the tank 208 can be located in the trunk of the vehicle. In addition, in some implementations, the entirety of the sensor cleaning system 200 inclusive of wiring is physically located external to the cab of the autonomous vehicle.

In some implementations, the sensor cleaning system 200 can further include a computing device area network. For example, the one or more computing devices 250 can transmit control signals on the computing device area network to control the plurality of flow control devices 212-216. Use of a computing device area network by the sensor cleaning system 200 contrasts with the more typical use of a local interconnect network in vehicular applications. Use of a computing device area network enables use of a message broadcast and renders the sensor cleaning system 200 infinitely scalable from a communications perspective.

As one example, in some implementations, at least two or more of the flow control devices 212-216 can be integrated into the gas tank 208, as described above. The integrated tank can include a number of connection pins that receive control signals from the computing device area network. In some implementations, the control signals that control the flow control devices 212-216 can include a sequence signal and a firing order signal that instruct the integrated tank how to control the corresponding flow control devices 212-216 according to a sensor cleaning sequence. In one example, the integrated tank can have four connection pins that respectively correspond to power, ground, sequence, and firing order.

Figure 4:
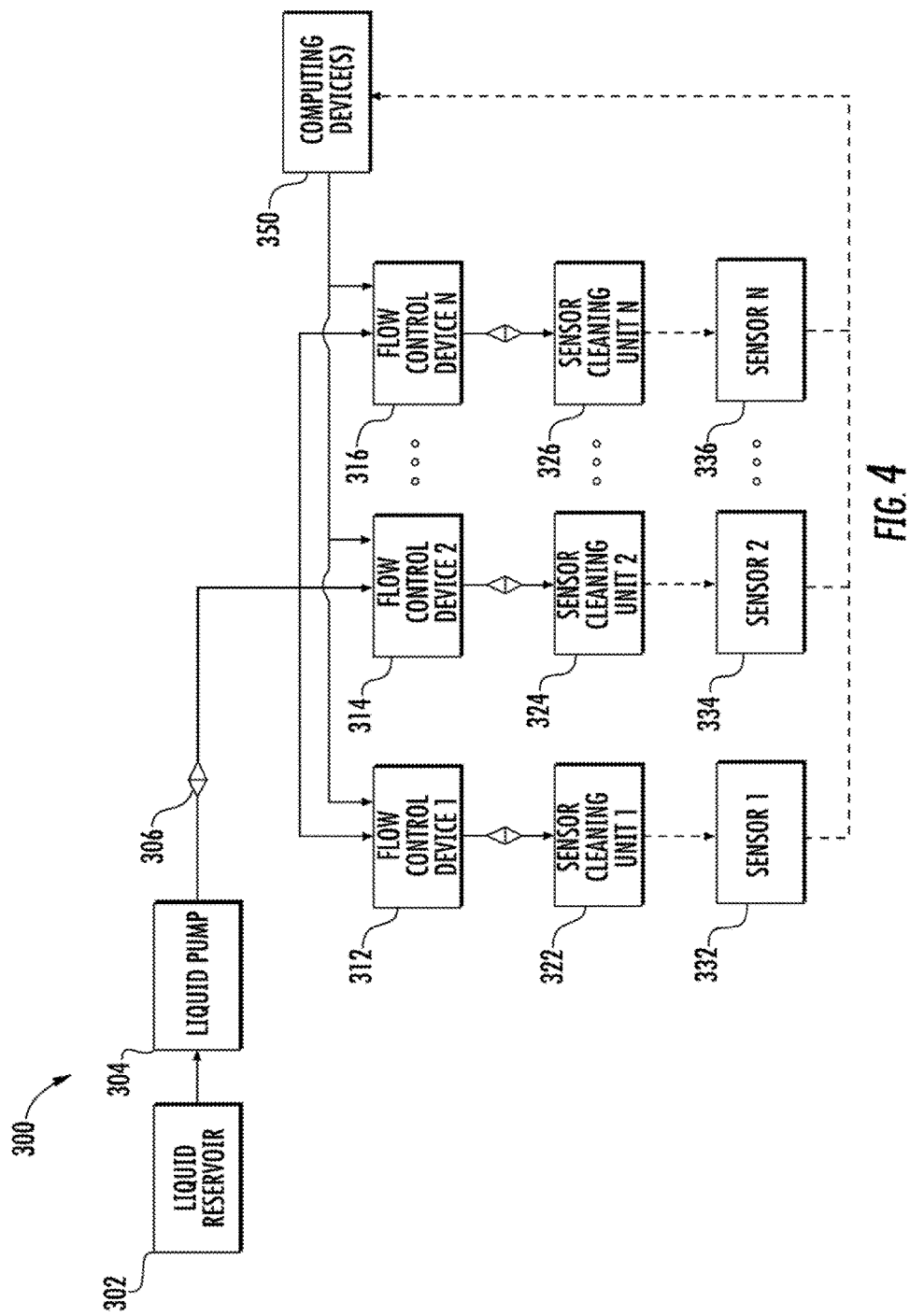
FIG. 4 depicts a block diagram of an example liquid-based sensor cleaning system according to example embodiments of the present disclosure.

FIG. 4 depicts a block diagram of an example liquid-based (i.e., hydraulic) sensor cleaning system 300 according to example embodiments of the present disclosure. The liquid-based sensor cleaning system 300 can optionally be included in the sensor cleaning system 150 of FIG. 1.

The liquid-based sensor cleaning system 300 of FIG. 4 includes a liquid pump 304. The liquid pump 304 can pump a liquid from a liquid reservoir 302. For example, the liquid reservoir 302 can be a windshield washer reservoir of the autonomous vehicle. Liquid pumped by the pump 304 can pass through a valve 306 (e.g., a one-way check valve) to reach one or more flow control devices 312, 314, and 316.

The liquid-based sensor cleaning system 300 can also include a plurality of sensor cleaning units, as shown at 322, 324, and 326. Although three sensor cleaning units 322-326 are shown, any number of units can be included in the system 300. Each sensor cleaning unit 322-326 can use the liquid to clean a respective sensor, as shown at 332, 334, and 336. For example, each sensor cleaning unit 322-326 can spray or otherwise release the liquid onto the sensor (e.g., a lens, cover, housing, or other portion of the sensor) to remove contaminants or other debris from the sensor (e.g., from the lens, cover, housing, or other portion of the sensor).

In some implementations, one or more of the sensor cleaning units 322-326 can include a nozzle that sprays the liquid onto the sensor 332-336 to clean the sensor 332-336. In some implementations, each sensor cleaning unit 322-326 can be integral to the corresponding sensor 332-336.

The liquid-based sensor cleaning system 300 can also include the plurality of flow control devices, as shown at 312, 314, and 316. The flow control devices 312-316 can respectively control a flow of the liquid from the liquid pump 304 to the plurality of sensor cleaning units 322-326.

The sensor cleaning system 300 can further include one or more computing devices 350. The one or more computing devices 350 can individually control each flow control device 312-316 to allow the flow of the liquid to the corresponding sensor cleaning unit 322-326 to enable the corresponding sensor cleaning unit 322-326 to individually clean the corresponding sensor 332-336. In some implementations, the one or more computing devices 350 can also control the liquid pump 304.

The one or more computing devices 350 can include one or more control devices, units, or components that interface with or otherwise control the one or more flow control devices 312-316. As examples, a computing device 350 can include one or more chips (e.g., ASIC or FPGA), expansion cards, and/or electronic circuitry (e.g., amplifiers, transistors, capacitors, etc.) that are organized or other configured to control one or more flow control devices (e.g., by way of control signals). In some implementations, a computing device 350 can include a processor that loads and executes instructions stored in a computer-readable media to perform operations.

In some implementations, the one or more computing devices 350 include a single computing device. In some implementations, the one or more computing devices 350 include a plurality of computing devices that respectively control the plurality of flow control devices 312-316. In some implementations, the one or more computing devices 350 can be physically located on a control board. For example, the control board can be physically coupled to a flow control device manifold, as described below.

In some implementations, the plurality of flow control devices 312-316 can include a plurality of solenoids that are individually controllable by the one or more computing devices 350 to respectively allow or disallow the flow of the pressurized liquid to the corresponding sensor cleaning unit 322-326. That is, the one or more computing devices 350 can individually control each solenoid to control the respective flow of liquid to the corresponding sensor cleaning unit 322-326, thereby enabling cleaning of a particular sensor 332-336 according to a sensor cleaning sequence.

In some implementations, the one or more computing devices 350 can determine a sensor cleaning sequence based at least in part on data indicative of a sensor condition. For example, in one or more implementations, the one or more computing devices 350 can obtain data indicative of a sensor condition from a windshield wiper control device, a precipitation sensor, a LIDAR sensor, one or more sensors configured to obtain sensor data, and/or an external weather condition monitoring system. The one or more computing devices 350 can determine a sensor cleaning sequence based at least in part on the data indicative of the sensor condition. For example, a windshield wiper control signal can indicate that precipitation is falling, or sensor data can indicate that a particular sensor of the plurality of sensors 332-336 requires cleaning. The one or more computing devices 350 can determine the sensor cleaning sequence based at least in part on the data indicative of a sensor condition.

Further, in some implementations, the one or more computing devices 350 can determine the sensor cleaning sequence based at least in part on a speed of the autonomous vehicle 10, a type of weather condition the autonomous vehicle 10 is operating in, or an operational frequency of one or more windshield wipers of the autonomous vehicle 10. For example, a frequency of a sensor cleaning sequence can be based on a windshield wiper operational frequency, such as a continuous or intermittent operational frequency.

In some implementations, the one or more computing devices 350 can cooperatively operate with one or more vehicle systems to determine the sensor cleaning sequence. For example, the one or more computing devices 350 can obtain data indicative of a weather condition from an external weather condition monitoring system for a route planned by the motion planning system 105, and can determine the sensor cleaning system based on the data indicative of the weather condition. In some implementations, the one or more computing devices 350 can obtain data from one or more vehicle systems, such as temperature data from a temperature sensor of the autonomous vehicle, or a vehicle speed from a vehicle controller, engine control unit, GPS data, speedometer, or other speed determining system, and use the data to determine the sensor cleaning sequence.

In some implementations, a sensor cleaning sequence can be a pattern, such as a pattern that is repeated at certain intervals. In some implementations, a sensor cleaning sequence can be a pattern that is modified in order to preferentially clean one or more sensors 332-336. In some implementations, the sensor cleaning sequence can be a pattern that is used to control a plurality of sensor cleaning units 322-326. In some implementations, the sensor cleaning sequence can be a pattern or frequency of cleaning an individual sensor 332-336 with an associated sensor cleaning unit 322-326.

In some implementations, the sensor cleaning sequence can include cleaning a sensor 332-336 with liquid sensor cleaning unit 322-326 based at least in part on a windshield wiper fluid spray signal. For example, the one or more computing devices 350 can be configured to receive a windshield wiper fluid spray signal from a windshield wiper control device 120. In some implementations, the sensor cleaning sequence can include cleaning a sensor 332-336 with a liquid sensor cleaning unit 322-326 when a windshield wiper fluid spray signal is received by the one or more computing devices 350.

In some implementations, one or more sensors 332-336 can be preferentially cleaned according to the sensor cleaning sequence. For example, a sensor 332-336 facing forward along a direction of travel of the autonomous vehicle may be exposed to more precipitation and/or debris than a rear facing sensor 332-336. In some implementations, the forward facing sensor 332-336 can be cleaned at a higher frequency than a rear facing sensor 332-336. Similarly, in some operating conditions, a rear facing sensor 332-336 may be exposed to more precipitation and/or debris than a forward facing sensor 332-336, and in such conditions, the rear facing sensor 332-336 can be cleaned at a higher frequency than the forward facing sensor 332-336.

In some implementations, the one or more computing devices 350 can actively (e.g., periodically, continuously, or near-continuously) assess a respective contamination status of each sensor 332-336 and determine, based on such contamination status, when a particular sensor 332-336 requires cleaning. In response to a determination that a particular sensor 332-336 requires cleaning, the one or more computing devices 350 can prioritize the sensor 332-336 for cleaning in a sensor cleaning sequence, and further control a particular flow control device 312-316 that corresponds to such particular sensor 332-336 to allow the flow of the liquid to the corresponding sensor cleaning unit 322-326 to enable the corresponding sensor cleaning unit 322-326 to clean the particular sensor 332-336 based on the sensor cleaning sequence.

According to another aspect of the present disclosure, in some implementations, the sensor cleaning system 300 can determine whether each sensor 332-336 requires cleaning based at least in part on the respective sensor data collected by each sensor 332-336. In particular, each sensor can collect sensor data that describes the surrounding environment or other aspects of the autonomous vehicle. The one or more computing devices 350 (either alone or in combination with other components or systems of the autonomous vehicle) can analyze the collected sensor data to assess the respective contamination status of each sensor 332-336. Thus, a feedback control loop can use the data collected by the sensor 332-336 to determine the cleaning requirement status of the sensor 332-336.

In some implementations, the sensor cleaning system 300 can cooperatively operate with various components of the autonomous vehicle (e.g., a perception system of the autonomous vehicle) to perform sensor contamination status detection based on the presence and/or absence of environmental objects observed by the autonomous vehicle in furtherance of its autonomous driving.

Cleaning of sensors according to a sensor cleaning sequence can improve the efficiency of the sensor cleaning system 300. For example, the sensor cleaning system 300 can prioritize cleaning particular sensors 332-336 in a sensor cleaning sequence that have been identified as requiring cleaning, rather than cleaning all sensors 332-336 periodically regardless of contamination status. As another example, the sensor cleaning system 300 can prioritize cleaning front-facing sensors more often than rear-facing sensors, or vice-versa, based on the sensor cleaning sequence. For example, in some operating conditions, front-facing sensors may experience increased accumulation of precipitation, dirt, dust, road salt, organic matter (e.g., "bug splatter," pollen, bird droppings, etc.), or other contaminants, while in other operating conditions, rear-facing sensors may experience increased accumulation of these contaminants. Cleaning sensors according to a sensor cleaning sequence based on precipitation type, precipitation intensity, individual contamination of a sensor, vehicle speed, windshield wiper frequency, etc. can allow for prioritizing cleaning of sensors 332-336 likely to or that are experiencing increased accumulation of contaminants, thereby more efficiently using energy and liquid resources and reducing "wear and tear" on the sensor cleaning units 322-326. Further, by cleaning sensors 332-336 according to a sensor cleaning sequence, the pressure of the liquid from the liquid pump 304 can be managed, helping to ensure that sufficient pressure is maintained to allow for adequate cleaning of the sensors 332-336.

Cleaning of sensors according to a sensor cleaning sequence can also improve the performance of the corresponding sensors 332-336. For example, sensors 323-336 experiencing increased accumulation of precipitation or debris can be prioritized for cleaning in a sensor cleaning sequence, and by cleaning one or more sensors 323-336 sequentially, instances in which the all of the sensors 332-336 are simultaneously cleaned and therefore the entire sensor system is temporarily "blinded" can be eliminated. Eliminating such instances of blinding results in better overall sensor data quality. In addition, cleaning of sensors 332-336 according to a sensor cleaning sequence can allow for the prioritization of cleaning a particular sensor 332-336 once it is recognized that a sensor 332-336 requires cleaning. Such is in contrast to periodic sensor cleaning techniques where a sensor 332-336 that requires cleaning may remain contaminated until the next scheduled sensor cleaning or until the next instance in which all sensors 332-336 can safely be simultaneously cleaned.

According to another aspect, in some implementations, two or more the plurality of flow control devices 312-316 (e.g., solenoids) can be included in a manifold (e.g., a solenoid manifold) or other combined structure.

In some implementations, an entirety of the sensor cleaning system 300 exclusive of wiring is physically located external to a cab of the autonomous vehicle. As one example, all system components except for the liquid reservoir 302 and/or the pump 304 can be located on the roof of the vehicle (e.g., in the pod mounted on the roof of the vehicle). For example, the liquid reservoir 302 and/or the pump 304 can be located under a hood of the vehicle. In addition, in some implementations, the entirety of the sensor cleaning system 300 inclusive of wiring is physically located external to the cab of the autonomous vehicle.

In some implementations, the sensor cleaning system 300 can further include a computing device area network. For example, the one or more computing devices 350 can transmit control signals on the computing device area network to control the plurality of flow control devices 312-316. Use of a computing device area network by the sensor cleaning system 300 contrasts with the more typical use of a local interconnect network in vehicular applications. Use of a computing device area network enables use of a message broadcast and renders the sensor cleaning system 300 infinitely scalable from a communications perspective.

Figure 5:
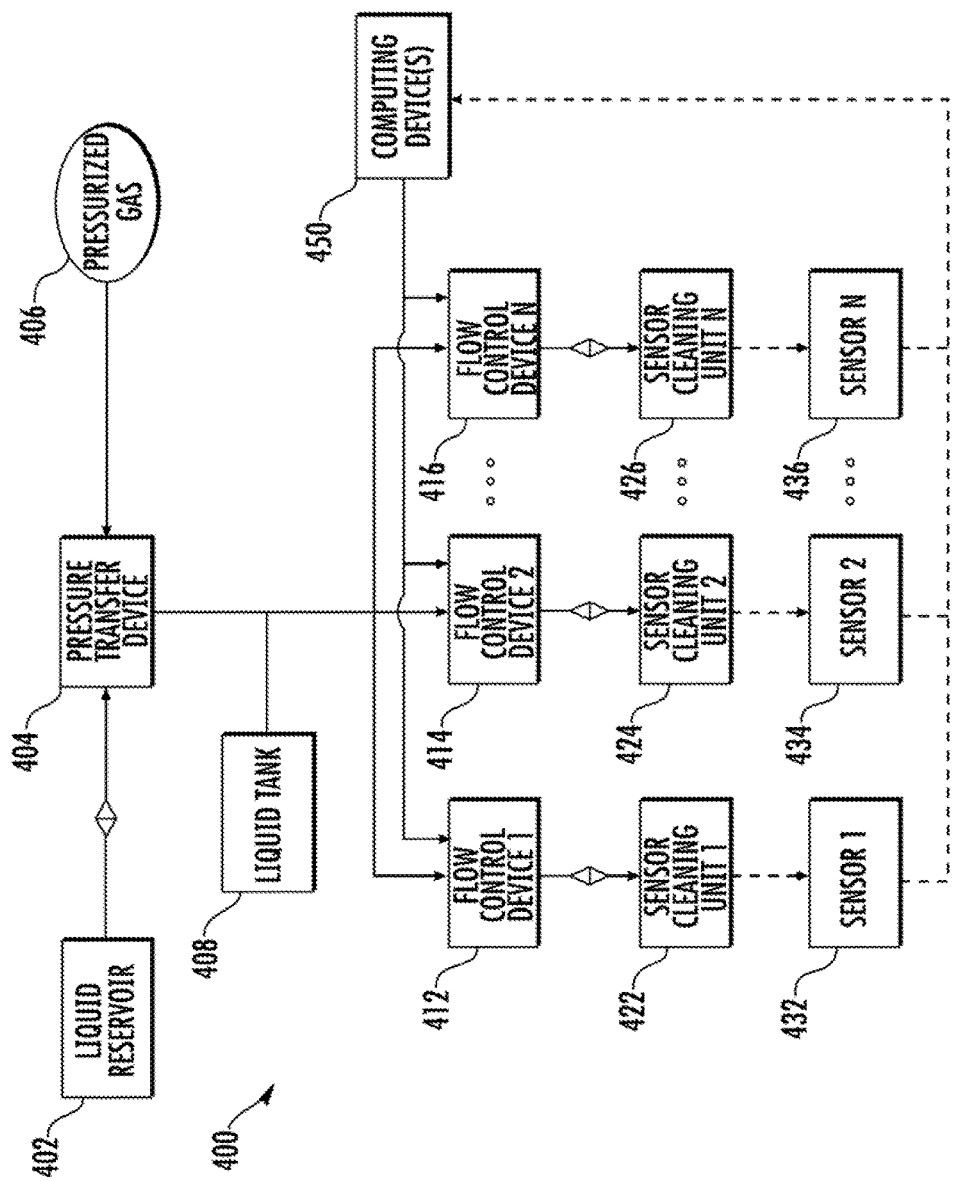
FIG. 5 depicts a block diagram of an example liquid-based sensor cleaning system according to example embodiments of the present disclosure.

FIG. 5 depicts a block diagram of an example liquid-based (i.e., hydraulic) sensor cleaning system 400 according to example embodiments of the present disclosure. The liquid-based sensor cleaning system 400 can optionally be included in the sensor cleaning system 150 of FIG. 1.

In particular, system 400 is similar to system 300 of FIG. 4, except that liquid cleaning system 400 is gas-pressurized. Use of a gas to pressurize the liquid cleaning system 400 enables the use of liquids at much higher pressures than can be achieved by alternative liquid cleaning systems that rely upon, for example, a pump to provide the flow of liquid to the liquid cleaning units. Higher pressure liquids enable improved cleaning through better contaminant removal.

The liquid-based sensor cleaning system 400 of FIG. 5 includes a pressure transfer device 404. The pressure transfer device 404 can receive liquid from a liquid reservoir 402. For example, the liquid reservoir 402 can be a windshield washer reservoir of the autonomous vehicle.

In some implementations, the pressure transfer device 404 can pull liquid from the liquid reservoir 402. For example, the pressure transfer device 404 can include an internal mechanism that operates to draw liquid from the liquid reservoir 402 to the pressure transfer device 404. In one example, such internal mechanism includes a biasing element (e.g., a mechanical spring) that biases a partition included in the pressure transfer device 404 toward increasing a volume of a liquid chamber in the device 404, thereby pulling liquid from the reservoir 402 to the device 404. In other implementations, the system 400 can include a pump (not illustrated) that actively pumps or pushes the liquid from the liquid reservoir 402 to the pressure transfer device 404. The pump can be controlled (e.g., by the one or more computing devices 450) based on knowledge of an amount of liquid included in the pressure transfer device 404 and/or the liquid tank 408. For example, various sensors or other components can be used to monitor the amount of liquid included in the pressure transfer device 404 and/or the liquid tank 408. When additional liquid is desired, the pump is operated to pump liquid from the reservoir 402 to the pressure transfer device 404.

Referring still to FIG. 5, the pressure transfer device 404 can use pressurized gas 406 to pressurize the liquid received from the liquid reservoir 402. Liquid pressurized by the pressure transfer device can be stored in a liquid tank 408. For example, the liquid tank 408 can be a liquid accumulator. In some implementations, the liquid tank 408 and the pressure transfer device 404 can be integrated together into a single component. The pressurized liquid provided by the pressure transfer device 404 and/or stored in the tank 408 can be respectively provided to a plurality of flow control devices 412, 414, and 416.

The liquid-based sensor cleaning system 400 can also include a plurality of sensor cleaning units, as shown at 422, 424, and 426. Although three sensor cleaning units 422-426 are shown, any number of units can be included in the system 400. Each sensor cleaning unit 422-426 can use the pressurized liquid to clean a respective sensor, as shown at 432, 434, and 436. For example, each sensor cleaning unit 422-426 can spray or otherwise release the pressurized liquid onto the sensor (e.g., a lens, cover, housing, or other portion of the sensor) to remove contaminants or other debris from the sensor (e.g., from the lens, cover, housing, or other portion of the sensor). In some implementations, one or more of the sensor cleaning units 422-426 can include a nozzle that sprays the pressurized liquid onto the sensor 432-436 to clean the sensor 432-436. In some implementations, each sensor cleaning unit 422-426 can be integral to the corresponding sensor 432-436.

The liquid-based sensor cleaning system 400 can also include the plurality of flow control devices, as shown at 412, 414, and 416. The flow control devices 412-416 can respectively control a flow of the pressurized liquid from the pressure transfer device 404 and/or the liquid tank 408 to the plurality of sensor cleaning units 422-426.

The sensor cleaning system 400 can further include one or more computing devices 450. The one or more computing devices 450 can individually control each flow control device 412-416 to allow the flow of the pressurized liquid to the corresponding sensor cleaning unit 422-426 to enable the corresponding sensor cleaning unit 422-426 to individually clean the corresponding sensor 432-436, such as according to a sensor cleaning sequence.

The one or more computing devices 450 can include one or more control devices, units, or components that interface with or otherwise control the one or more flow control devices 412-416. As examples, a computing device 450 can include one or more chips (e.g., ASIC or FPGA), expansion cards, and/or electronic circuitry (e.g., amplifiers, transistors, capacitors, etc.) that are organized or otherwise configured to control one or more flow control devices (e.g., by way of control signals). In some implementations, a computing device 450 can include a processor that loads and executes instructions stored in a computer-readable media to perform operations.

In some implementations, the one or more computing devices 450 include a single computing device. In some implementations, the one or more computing devices 450 include a plurality of computing devices that respectively control the plurality of flow control devices 412-416. In some implementations, the one or more computing devices 450 can be physically located on a control board. For example, the control board can be physically coupled to a flow control device manifold, as described below.

In some implementations, the plurality of flow control devices 412-416 can include a plurality of solenoids that are individually controllable by the one or more computing devices 450 to respectively allow or disallow the flow of the pressurized liquid to the corresponding sensor cleaning unit 422-426. That is, the one or more computing devices 450 can individually control each solenoid to control the respective flow of liquid to the corresponding sensor cleaning unit 422-426, thereby enabling individualized cleaning of each sensor 432-436.

In some implementations, the one or more computing devices 450 can determine a sensor cleaning sequence based at least in part on data indicative of a sensor condition. For example, in one or more implementations, the one or more computing devices 450 can obtain data indicative of a sensor condition from a windshield wiper control device, a precipitation sensor, a LIDAR sensor, one or more sensors configured to obtain sensor data, and/or an external weather condition monitoring system. The one or more computing devices 450 can determine a sensor cleaning sequence based at least in part on the data indicative of the sensor condition. For example, a windshield wiper control signal can indicate that precipitation is falling, or sensor data can indicate that a particular sensor of the plurality of sensors 432-436 requires cleaning. The one or more computing devices 450 can determine the sensor cleaning sequence based at least in part on the data indicative of a sensor condition.

Further, in some implementations, the one or more computing devices 450 can determine the sensor cleaning sequence based at least in part on a speed of the autonomous vehicle 10, a type of weather condition autonomous vehicle 10 is operating in, or an operational frequency of one or more windshield wipers of the autonomous vehicle 10. For example, a frequency of a sensor cleaning sequence can be based on a windshield wiper operational frequency, such as a continuous or intermittent operational frequency.

In some implementations, the one or more computing devices 450 can cooperatively operate with one or more vehicle systems to determine the sensor cleaning sequence. For example, the one or more computing devices 450 can obtain data indicative of a weather condition from an external weather condition monitoring system for a route planned by the motion planning system 105, and can determine the sensor cleaning sequence based on the data indicative of the weather condition. In some implementations, the one or more computing devices 450 can obtain data from one or more vehicle systems, such as temperature data from a temperature sensor of the autonomous vehicle, or a vehicle speed from a vehicle controller, engine control unit, GPS data, speedometer, or other speed determining system or device, and use the data to determine the sensor cleaning sequence.

In some implementations, a sensor cleaning sequence can be a pattern, such as a pattern that is repeated at certain intervals. In some implementations, a sensor cleaning sequence can be a pattern that is modified in order to preferentially clean one or more sensors 432-436. In some implementations, the sensor cleaning sequence can be a pattern that is used to control a plurality of sensor cleaning units 422-426. In some implementations, the sensor cleaning sequence can be a pattern or frequency of cleaning an individual sensor 432-436 with an associated sensor cleaning unit 422-426.

In some implementations, the sensor cleaning sequence can include cleaning a sensor 432-436 with liquid sensor cleaning unit 422-426 based at least in part on a windshield wiper fluid spray signal. For example, the one or more computing devices 450 can be configured to receive a windshield wiper fluid spray signal from a windshield wiper control device 120. In some implementations, the sensor cleaning sequence can include cleaning a sensor 432-436 with a liquid sensor cleaning unit 422-426 when a windshield wiper fluid spray signal is received by the one or more computing devices 450.

In some implementations, one or more sensors 432-436 can be preferentially cleaned according to the sensor cleaning sequence. For example, a sensor 432-436 facing forward along a direction of travel of the autonomous vehicle may be exposed to more precipitation and/or debris than a rear facing sensor 432-436. In some implementations, the forward facing sensor 432-436 can be cleaned at a higher frequency than a rear facing sensor 432-436. Similarly, in some operating conditions, a rear facing sensor 432-436 may be exposed to more precipitation and/or debris than a forward facing sensor 432-436, and in such conditions, the rear facing sensor 432-436 can be cleaned at a higher frequency than the forward facing sensor 432-436.

In some implementations, the one or more computing devices 450 can actively (e.g., periodically, continuously, or near-continuously) assess a respective contamination status of each sensor 432-436 and determine, based on such contamination status, when a particular sensor 432-436 requires cleaning. In response to a determination that a particular sensor 432-436 requires cleaning, the one or more computing devices 450 can prioritize the sensor 432-436 for cleaning in a sensor cleaning sequence, and further control a particular flow control device 412-416 that corresponds to such particular sensor 432-436 to allow the flow of the liquid to the corresponding sensor cleaning unit 422-426 to enable the corresponding sensor cleaning unit 422-426 to clean the particular sensor 432-436 based on the sensor cleaning sequence.

According to another aspect of the present disclosure, in some implementations, the sensor cleaning system 400 can determine whether each sensor 432-436 requires cleaning based at least in part on the respective sensor data collected by each sensor 432-436. In particular, each sensor 432-436 can collect sensor data that describes the surrounding environment or other aspects of the autonomous vehicle 10. The one or more computing devices 450 (either alone or in combination with other components or systems of the autonomous vehicle 10) can analyze the collected sensor data to assess the respective contamination status of each sensor 432-436. Thus, a feedback control loop can use the data collected by the sensor 432-436 to determine the cleaning requirement status of the sensor 432-436.

In some implementations, the sensor cleaning system 400 can cooperatively operate with various components of the autonomous vehicle 10 (e.g., a perception system of the autonomous vehicle 10) to perform sensor contamination status detection based on the presence and/or absence of environmental objects observed by the autonomous vehicle 10 in furtherance of its autonomous driving.

Cleaning of sensors according to a sensor cleaning sequence can improve the efficiency of the sensor cleaning system 400. For example, the sensor cleaning system 400 can prioritize cleaning particular sensors 432-436 in a sensor cleaning sequence that have been identified as requiring cleaning, rather than cleaning all sensors 432-436 periodically regardless of contamination status. As another example, the sensor cleaning system 400 can prioritize cleaning front-facing sensors 432-436 more often than rear-facing sensors 432-436, or vice-versa, based on the sensor cleaning sequence. For example, in some operating conditions, front-facing sensors 432-436 may experience increased accumulation of precipitation, dirt, dust, road salt, organic matter (e.g., "bug splatter," pollen, bird droppings, etc.), or other contaminants, while in other operating conditions, rear-facing sensors 432-436 may experience increased accumulation of these contaminants. Cleaning sensors 432-436 according to a sensor cleaning sequence based on precipitation type, precipitation intensity, individual contamination of a sensor 432-436, vehicle speed, windshield wiper frequency, etc. can allow for prioritizing sensor cleaning of sensors 432-436 likely to experience increased accumulation of contaminants, thereby more efficiently using energy and liquid resources and reducing "wear and tear" on the sensor cleaning units 422-426. Further, by cleaning sensors 432-436 according to a sensor cleaning sequence, the pressure of the liquid from the pressure transfer device 404 can be managed, helping to ensure that sufficient pressure is maintained to allow for adequate cleaning of the sensors 432-436.

Cleaning of sensors according to a sensor cleaning sequence can also improve the performance of the corresponding sensors 432-436. For example, sensors 432-436 experiencing increased accumulation of precipitation or debris can be prioritized for cleaning in a sensor cleaning sequence, and by cleaning one or more sensors 432-436 sequentially, instances in which the all of the sensors 432-436 are simultaneously cleaned and therefore the entire sensor system is temporarily "blinded" can be eliminated. Eliminating such instances of blinding results in better overall sensor data quality. In addition, cleaning of sensors 432-436 according to a sensor cleaning sequence can allow for the prioritization of cleaning a particular sensor 432-436 once it is recognized that a sensor 432-436 requires cleaning. Such is in contrast to periodic sensor cleaning techniques where a sensor 432-436 that requires cleaning may remain contaminated until the next scheduled sensor cleaning or until the next instance in which all sensors 432-436 can safely be simultaneously cleaned.

In some implementations, one or more of the flow control device manifolds (e.g., solenoid manifolds) can be integrated with the liquid tank 408. As an example, a solenoid manifold that controls the respective flow of the pressurized liquid to the sensor cleaning units 422-426 can be physically located within a pressurized volume of the liquid stored by a liquid tank 408. In some implementations, the one or more computing devices 450 can also be integrated with the liquid tank 408.

Inclusion of the flow control device manifold within the liquid tank 408 enables such components to be provided as a single package, thereby saving space. Inclusion of the flow control device manifold within the liquid tank 408 also decreases the respective liquid flow distances from the tank 408 to the sensor cleaning units 422-426, thereby eliminating pressure loss due to hose length and, conversely, increasing pressure of the liquid when used by the sensor cleaning units 422-426.

In addition, in some implementations, the integrated liquid tank can further include valves, a pressure sensor, and/or controls coupled thereto or otherwise integrated therewith.

In some implementations, an entirety of the sensor cleaning system 400 exclusive of wiring is physically located external to a cab of the autonomous vehicle. As one example, all system components except for the liquid reservoir 402 can be located on the roof of the vehicle (e.g., in the pod mounted on the roof of the vehicle). For example, the liquid reservoir 402 can be located under a hood of the vehicle. In addition, in some implementations, the entirety of the sensor cleaning system 400 inclusive of wiring is physically located external to the cab of the autonomous vehicle.

In some implementations, the sensor cleaning system 400 can further include a computing device area network. For example, the one or more computing devices 450 can transmit control signals on the computing device area network to control the plurality of flow control devices 412-416. Use of a computing device area network by the sensor cleaning system 400 contrasts with the more typical use of a local interconnect network in vehicular applications. Use of a computing device area network enables use a message broadcast and renders the sensor cleaning system 400 infinitely scalable from a communications perspective.

As one example, in some implementations, at least two or more of the flow control devices 412-416 can be integrated into the liquid tank 408, as described above. The integrated tank can include a number of connection pins that receive control signals from the computing device area network. In some implementations, the control signals that control the flow control devices 412-416 can include a sequence signal and a firing order signal that instruct the integrated tank how to control the corresponding flow control devices 412-416. In one example, the integrated tank can have four connection pins that respectively correspond to power, ground, sequence, and firing order.

Figure 6:
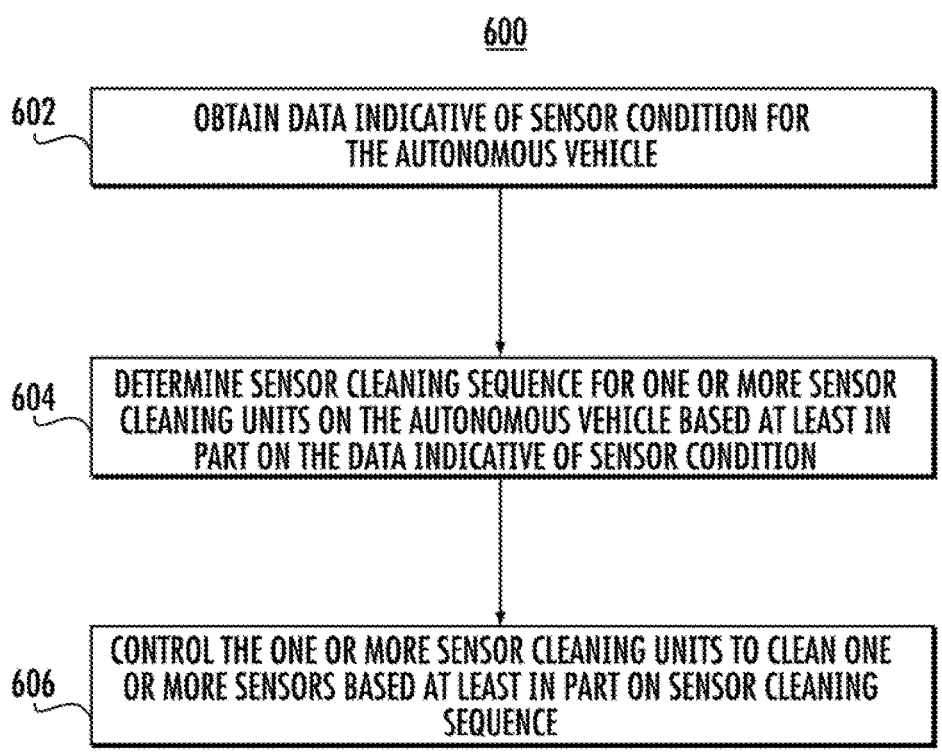
FIG. 6 depicts a flow chart diagram of an example method to perform sensor cleaning according to example embodiments of the present disclosure.

FIG. 6 depicts a flow chart diagram of an example method (600) to clean autonomous vehicle sensors according to example embodiments of the present disclosure. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure.

At (602), the method (600) can include obtaining, by a computing system comprising one or more computing devices, data indicative of a sensor condition for an autonomous vehicle. The autonomous vehicle 10 can include one or more sensors 101. For example, the one or more sensors 101 can include one or more cameras, Light Detection and Ranging (LIDAR) system sensors, Radio Detection and Ranging (RADAR) system sensors, and/or other sensors. Each sensor can have one or more corresponding sensor cleaning units that are configured to clean such sensor (e.g., a gas or a liquid sensor cleaning unit or a sensor wiper device).

For example, in some implementations, the computing system can obtain data indicative of the sensor condition by obtaining a windshield wiper control signal from a windshield wiper control device of the autonomous vehicle. For example, during operation of the autonomous vehicle 10, a passenger in the autonomous vehicle 10 may experience difficulty seeing through the windshield of the autonomous vehicle 10, such as, for example, when the autonomous vehicle 10 is experiencing rain or snow conditions. The passenger can operate the windshield wipers on the autonomous vehicle by selecting a windshield wiper operational mode using a windshield wiper control device 120, such as a windshield wiper control arm located on a steering column of the autonomous vehicle. The computing system can be configured to receive a windshield wiper control signal from the windshield wiper control device 120, and using the winter wiper control signal, determine a sensor cleaning sequence for one or more sensor cleaning units in the sensor cleaning system 150.

As another example, in some implementations, the computing system can obtain data indicative of the sensor condition by obtaining data indicative of a weather condition from a precipitation sensor of the autonomous vehicle. For example, an autonomous vehicle 10 can be equipped with a precipitation sensor 130, such as a precipitation sensor 130 positioned on a windshield of the autonomous vehicle 10. The precipitation sensor 130 can be configured to determine that the autonomous vehicle 10 is operating in precipitation conditions. For example, the autonomous vehicle 10 may have an automated windshield wiper system wherein the windshield wipers on the autonomous vehicle 10 are operated when the precipitation sensor 130 senses that the autonomous vehicle 10 is operating in rain, snow, or sleet conditions. The computing system can be configured to obtain data indicative of a sensor condition for the autonomous vehicle 10 by receiving data and/or a signal from the precipitation sensor 130 indicative of weather conditions the autonomous vehicle 10 is operating in.

As another example, in some implementations, the computing system can obtain data indicative of the sensor condition by obtaining data indicative of a weather condition from a LIDAR sensor of the autonomous vehicle. For example, during operation of the autonomous vehicle 10, a LIDAR sensor can be configured to scan the environment around the autonomous vehicle 10, such as, for example, by emitting light pulses and receiving a reflected light from objects surrounding the autonomous vehicle 10. In some implementations, the LIDAR sensor can receive reflected light from precipitation, such as rain, snow, and/or sleet. The computing system can be configured to obtain data indicative of a sensor condition for the autonomous vehicle 10 by receiving data indicative of a weather condition from the LIDAR sensor.

As another example, in some implementations, the computing system can obtain data indicative of the sensor condition by obtaining data indicative of a weather condition from a weather condition monitoring system external to the autonomous vehicle. For example, a weather condition monitoring system 140 can be configured to receive meteorological data, such as radar data indicative of precipitation, data from weather monitoring stations, such as rain gauges located at airports, or other meteorological data. The computing system can be configured to obtain data indicative of a weather condition the autonomous vehicle 10 is operating in by, for example, obtaining data from the weather condition monitoring system 140 for the geographical area in which the autonomous vehicle 10 is operating. For example, using GPS data, map data, or other data, the computing system can be configured to determine a geographic location of the autonomous vehicle 10. The computing system can further be configured to communicate with the external weather condition monitoring system 140 to obtain meteorological data for the geographic location in which the autonomous vehicle 10 is located, such as by communicating over a wireless network. In an embodiment, the computing system can be configured to obtain data indicative of forecasted weather conditions for a geographic location in which the autonomous vehicle 10 will be operated at a future point in time, such as, for example, by obtaining data indicative of a weather condition for a planned route of travel for the autonomous vehicle 10.

As another example, the computing system can obtain data indicative of the sensor condition by obtaining sensor data from a sensor 101 of the autonomous vehicle. For example, the computing system can be configured to obtain imagery from one or more camera sensors, RADAR data from one or more RADAR sensors, or LIDAR data from one or more LIDAR sensors. In some implementations, the computing system can determine the sensor cleaning sequence based at least in part on the sensor data. For example, imagery data captured by a camera sensor can be used to detect an occlusion on the camera, a disappearance of an observed object, an absence of an object that is expected to be observed, a lens flaring effect when the autonomous vehicle passes under light, or other condition indicating that the camera requires cleaning. Similarly, LIDAR or RADAR data can indicate a corresponding LIDAR or radar sensor should be cleaned based on a stretching effect of static objects observed by the respective sensor. The computing system can determine the sensor cleaning sequence based at least in part on sensor data to prioritize cleaning one or more sensors 101 in the sensor cleaning sequence.

At (604), the method (600) can include determining, by the computing system, a sensor cleaning sequence for one or more sensor cleaning units of the autonomous vehicle based at least in part on the data indicative of the sensor condition.

For example, in some implementations, the computing system can determine the sensor cleaning sequence based at least in part on a windshield wiper control signal from a windshield wiper control device 120. For example, when the computing system receives a signal from a windshield wiper control device 120 indicating that a user has turned on the windshield wipers, the computing system can determine that one or more sensors 101 should be cleaned to remove precipitation, and determine a sensor cleaning sequence in order to clean the one or more sensors 101.

Further, in some implementations, the computing system can determine a frequency of the sensor cleaning sequence based at least in part on an operational frequency of one or more windshield wipers of the autonomous vehicle 10. The windshield wiper control signal can include, for example, data indicative of a windshield wiper operational frequency, such as whether the windshield wipers are to be operated in an intermittent or continuous mode and/or data indicative of an operational frequency (i.e., windshield wiper cycles per time period). The computing system can determine a frequency of the sensor cleaning sequence based at least in part on the operational frequency of the windshield wipers. For example, when the windshield wipers are operated at an intermittent frequency, the frequency of the sensor cleaning sequence can be set at a first frequency. When the windshield wipers are operated at a continuous frequency, the frequency of the sensor cleaning sequence can be set at a second frequency, such as a frequency higher than the first frequency. Additional sensor cleaning sequence frequencies can be determined based on additional windshield wiper frequencies. In some implementations, the frequency of the sensor cleaning sequence can be a frequency that is higher than the operational frequency of the windshield wipers. In this way, the computing system can determine a frequency of the sensor cleaning sequence based at least in part on an operational frequency of one or more windshield wipers of the autonomous vehicle 10.

Further, in some implementations, the computing system can determine a sensor cleaning sequence based at least in part on a windshield wiper fluid spray signal. For example, during operation, an autonomous vehicle 10 may pass through a mud puddle, thereby splashing mud on the windshield and one or more sensors 101. A passenger riding in the autonomous vehicle 10 may press a windshield wiper fluid spray switch on a windshield wiper control device 120 in order to spray the windshield with windshield wiper fluid in order to remove the mud. In some implementations, the computing system can be configured to determine a sensor cleaning sequence based on the windshield wiper fluid spray signal in order to control one or more liquid cleaning units in the sensor cleaning system to clean one or more sensors 101 with a liquid in order to remove any mud that may have accumulated on the one or more sensors 101.

Further, in some implementations, the computing system can further determine a sensor cleaning sequence in which a gas cleaning unit sprays a sensor 101 with a gas in order to remove any residual liquid on the sensor 101 sprayed on the sensor 101 with the liquid cleaning unit. For example, upon obtaining a windshield wiper spray signal from a windshield wiper control device 120, the computing system can determine a sensor cleaning sequence in which a sensor is first cleaned with a liquid cleaning unit and subsequently cleaned with a gas cleaning unit.

As another example, in some implementations, the computing system can determine the sensor cleaning sequence based at least in part on data indicative of a weather condition from a precipitation sensor 130. For example, a first type precipitation, such as snow, may produce a first signature or pattern when sensed by the precipitation sensor 130. A second type of precipitation, such as rain, may produce a second signature or pattern when sensed by the precipitation sensor 130. During rain conditions, for example, the computing system may determine a sensor cleaning sequence in order to prioritize cleaning forward facing sensors 101 during certain operating conditions, whereas during snow conditions, the computing system may determine a sensor cleaning sequence in order to prioritize cleaning rear facing sensors 101 during certain operating conditions. Similarly, the computing system can be configured to determine an intensity of the weather conditions experienced by the autonomous vehicle 10 based on the data indicative of a weather condition obtained from the precipitation sensor 130. For example, during light rain conditions, raindrops may produce a first signature or pattern when sensed by the precipitation sensor 130, whereas during heavy rain conditions, raindrops may produce a second signature or pattern when sensed by the precipitation sensor 130. In some implementations, the computing system can be configured to determine the type and/or level of the precipitation experienced by the autonomous vehicle 10 based on the data indicative of a weather condition obtained from the precipitation sensor 130, and determine a sensor cleaning sequence based on the intensity of the precipitation, such as, for example, using a higher frequency sensor cleaning sequence during heavy rain conditions than during light rain conditions.

As another example, in some implementations, the computing system can determine the sensor cleaning sequence based at least in part on data indicative of a weather condition from a LIDAR sensor. For example, a first type precipitation, such as snow, may produce a first signature or pattern when sensed by the LIDAR sensor. A second type of precipitation, such as rain, may produce a second signature or pattern when sensed by the LIDAR sensor. During rain conditions, for example, the computing system may determine a sensor cleaning sequence in order to prioritize cleaning forward facing sensors 101 during certain operating conditions, whereas during snow conditions, the computing system may determine a sensor cleaning sequence in order to prioritize cleaning rear facing sensors 101 during certain operating conditions. Similarly, the computing system can be configured to determine a precipitation level experienced by the autonomous vehicle 10 based on the data indicative of a weather condition obtained from the LIDAR sensor. For example, during light rain conditions, raindrops may produce a first signature or pattern when sensed by the LIDAR sensor, whereas during heavy rain conditions, raindrops may produce a second signature or pattern when sensed by the LIDAR sensor. In some implementations, the computing system can be configured to determine the type and/or level of precipitation experienced by the autonomous vehicle based on the data indicative of a weather condition obtained from the LIDAR sensor, and determine a sensor cleaning sequence based on the intensity of the precipitation, such as, for example, using a higher frequency sensor cleaning sequence during heavy rain conditions than during light rain conditions.

As another example, in some implementations, the computing system can determine the sensor cleaning sequence based at least in part on data indicative of a weather condition from an external weather condition monitoring system. For example, during rain conditions the computing system may determine a sensor cleaning sequence in order to prioritize cleaning forward facing sensors 101 during certain operating conditions, whereas during snow conditions, the computing system may determine a sensor cleaning sequence in order to prioritize cleaning rear facing sensors 101 during certain operating conditions. Additionally, the computing system may determine a sensor cleaning sequence based on the intensity of precipitation the autonomous vehicle 10 is operating in such as, for example, using a higher frequency sensor cleaning sequence during heavy rain conditions than during light rain conditions.

As another example, in some implementations, the computing system can determine the sensor cleaning sequence based at least in part on sensor data from a sensor 101. For example, a sensor 101, such as a camera or LIDAR sensor, can be configured to collect sensor data that describes the surrounding environment or other aspects of the autonomous vehicle 10. The computing system (either alone or in combination with other components or systems of the autonomous vehicle 10) can analyze the collected sensor data (e.g., camera data or LIDAR data) to assess whether the sensor 101 should be prioritized for cleaning in the sensor cleaning sequence.

As one example, the one or more sensors 101 can include a camera that collects imagery and the sensor cleaning system can determine that the camera requires cleaning based at least in part on one or more characteristics of the imagery captured by the camera. As examples, the computing system can determine that the camera requires cleaning based at least in part on at least one of a sharpness and a brightness of at least a portion of a frame included in imagery captured by the camera. For example, if the sharpness, brightness, and/or other characteristic(s) fall below respective threshold value(s), then it can be determined that the camera requires cleaning and should be prioritized for cleaning in the sensor cleaning sequence. As another example, if the sharpness, brightness, and/or other characteristic(s) decline or otherwise worsen over a number of frames or over time, then it can be determined that the camera requires cleaning. As yet another example, if the sharpness, brightness, and/or other characteristic(s) of a first portion of a frame of imagery captured by the camera are significantly worse than the sharpness, brightness, and/or other characteristic(s) of a second portion of the same frame of imagery, then it can be determined that the camera requires cleaning, and the computing system can prioritize cleaning the camera in the sensor cleaning sequence.

In yet another example, the computing system can detect an occlusion exhibited at a same location in a plurality of frames captured by a camera. For example, a patch of dirt might have accumulated on the camera lens, thereby occluding the camera's field of view over a number of frames of imagery. In response, the computing system can determine that the camera requires cleaning and prioritize cleaning the camera in the sensor cleaning sequence.

As another example, in some implementations, to determine that one or more sensors 101 require cleaning, the computing system can detect a disappearance of an observed object. As an example, if the autonomous vehicle 10 continuously observes a pedestrian over a period of sensor data collection and processing iterations, and then suddenly the pedestrian is no longer observed based on the sensor data, it can be assumed that one or more of the sensors 101 that collected the corresponding sensor data require cleaning. For example, a splash from a mud puddle can have obscured a camera lens, thereby causing the pedestrian to disappear from the sensor data collected by the corresponding camera. In response, the computing system can determine that the camera requires cleaning and prioritize cleaning the camera in a sensor cleaning sequence.

As another example, to determine that one or more sensors 101 require cleaning, the computing system can detect an absence of an object that is expected to be observed. As an example, an autonomous vehicle 10 can be located at a known location at which the autonomous vehicle 10 would expect, for example based on map data, to observe a stoplight. However, if the autonomous vehicle 10 does not observe the stoplight at the expected location, then it can be assumed that one or more of the sensors 101 that would be expected to collect sensor data indicative of the expected object require cleaning. For example, an accumulation of dirt may cause a camera to have an obscured field of view and, therefore, fail to observe the stoplight. In response, the computing system can determine that the camera requires cleaning and prioritize cleaning the camera in the sensor cleaning sequence.

As another example, in some implementations, the computing system can detect a lens flaring effect caused by an accumulation of fluid on the lens of a sensor 101. For example, if the autonomous vehicle is operated during night in rainy conditions, rain can accumulate on the lens of a camera. When the autonomous vehicle 10 passes underneath a light source, individual rain droplets on the camera lens can flare the light source, causing a lens flaring effect. This can temporarily reduce the effectiveness of the camera due to the lens flaring effect. In some implementations, the computing system can be configured to detect the presence of the rain droplets based on the lens flaring effect, and can be configured to prioritize cleaning of the camera prior to the autonomous vehicle 10 passing underneath an intense light source in order to minimize the lens flaring effect.

As another example, in some implementations, the computing system can determine a LIDAR or RADAR sensor should be cleaned based on a stretching effect. For example, a LIDAR sensor can be configured to detect the presence of a static image, such as a stop sign. However, when a fluid, such as one or more rain droplets, accumulates on the LIDAR sensor, the static object can be stretched as the reflected light signal is pulled through the fluid as the sensor rotates. The computing system can be configured to detect the stretched static image, and determine that the LIDAR sensor should be prioritized for cleaning in the sensor cleaning sequence.

As another example, in some implementations, the computing system can determine the sensor cleaning sequence based at least in part on a speed of the autonomous vehicle 10. For example, the computing system can be configured to determine a speed of the autonomous vehicle 10 based on one or more autonomous vehicle operating parameters, such as one or more signals from a speedometer, an engine control unit (ECU), GPS data, motion planning system, map data, or other autonomous vehicle operating parameter. The computing system can be configured to determine the sensor cleaning sequence based at least in part on the speed of the autonomous vehicle 10.

As one example, in some implementations, while an autonomous vehicle 10 is operated below a certain speed threshold in certain precipitation or debris conditions, (e.g., rain), forward facing sensors 101 may be exposed to increased precipitation as compared to rear facing sensors 101. In such a situation, the computing system can determine a sensor cleaning sequence in which one or more sensor cleaning units associated with the forward facing sensors 101 are controlled to clean the forward facing sensors 101 at a higher frequency than rear facing sensor cleaning units are controlled to clean associated rear facing sensors 101.

Additionally, once the autonomous vehicle 10 is operated above a certain speed threshold in the same precipitation conditions, aerodynamic effects may contribute to removing precipitation from the forward facing sensors 101. Moreover, as the autonomous vehicle 10 travels forward, a pressure differential can develop towards the rear of the vehicle, which can cause the rear facing sensors 101 to be exposed to increased precipitation and/or debris. In such a situation, the computing system can be configured to determine a sensor cleaning sequence in which one or more sensor cleaning units associated with the rear facing sensors 101 clean the rear facing sensors 101 at a higher frequency than forward facing sensor cleaning units clean associated forward facing sensors 101. Similarly, other sensor cleaning sequences can be determined by a computing system in order to prioritize cleaning of sensors exposed to increased precipitation and/or debris based at least in part on the speed of the autonomous vehicle 10.

As another example, in some implementations, while an autonomous vehicle 10 is operated above a certain speed threshold in high debris conditions (e.g., dust, pollen, bugs) or in certain precipitation conditions, forward facing sensors 101 may be exposed to increased debris and/or precipitation as compared to rear facing sensors 101. In such a situation, the computing system can determine a sensor cleaning sequence in which one or more sensor cleaning units associated with the forward facing sensors 101 are controlled to clean the forward facing sensors 101 at a higher frequency than rear facing sensor cleaning units are controlled to clean associated rear facing sensors 101. Thus, in some implementations, the sensor cleaning sequence can be determined based at least in part on the speed of the autonomous vehicle 10.

As another example, in some implementations, the computing system can determine the sensor cleaning sequence based at least in part on a type of weather condition in the autonomous vehicle is operating in. For example, a computing system can be configured to determine a type of weather condition the autonomous vehicle 10 is operating in, such as by analyzing data from a precipitation sensor, analyzing data from a LIDAR sensor, receiving data from a weather condition monitoring system, or receiving data indicative of a temperature external to the autonomous vehicle. For example, when a passenger in the autonomous vehicle 10 operates the windshield wipers on the autonomous vehicle by selecting a windshield wiper operational mode using a windshield wiper control device 120, the computing system can be configured to determine that the autonomous vehicle 10 is operating in some type of precipitation. The computing system can be further configured to receive data indicative of a temperature external to the autonomous vehicle 10 such as, for example, by receiving a signal from a thermometer or other temperature sensing device. Using one or more temperature thresholds, the computing system can be configured to determine that the precipitation is rain, sleet, or snow. For example, when the temperature is below the freezing point, the computing device can be configured to determine that the precipitation is snow. Similarly, a type and/or intensity of precipitation can be determined by other methods, such as analyzing LIDAR data or obtaining data indicative of a weather condition from a weather condition monitoring system 140, as described herein.

The computing system can then determine a sensor cleaning sequence based at least in part on the type of weather condition the autonomous vehicle 10 is operating in. For example, when the autonomous vehicle 10 is operated in rain conditions, forward facing sensors may be exposed to more precipitation than rear facing sensors. The computing system can be configured to prioritize cleaning forward facing sensors 101 over rear facing sensors 101, such as by determining a sensor cleaning sequence in which the forward facing sensors 101 are cleaned at a higher frequency than the rear facing sensors 101. However, when the autonomous vehicle 10 is operated in snow conditions, the snow may be below a temperature such that the snow does not stick to the forward facing sensors 101, but due to aerodynamic effects, the snow may accumulate on rear facing sensors 101. The computing system can be determine a sensor cleaning sequence that prioritizes cleaning rear facing sensors 101 over forward facing sensors 101, such as by determining a sensor cleaning sequence in which the rear facing sensors 101 are cleaned at a higher frequency than the forward facing sensors 101.

In some implementations, a sensor cleaning sequence can include cleaning a plurality of sensors with a plurality of sensor cleaning units. For example, a sensor cleaning sequence can include alternating between cleaning a forward facing sensor 101 and a rear facing sensor 101. A first sensor 101 can be cleaned at a first point in time, and a second sensor can be cleaned at a second point in time after the first sensor has been cleaned.

In some implementations, a sensor cleaning sequence can include cleaning a sensor with a sensor cleaning unit a plurality of times. For example, a sensor cleaning sequence can include cleaning a single sensor 101 at a particular frequency or according to a pattern. For example, a single sensor 101 can be cleaned at a regular interval (e.g., every five seconds), or according to a pattern (e.g., alternating between intervals of two seconds and five seconds).

In some implementations, a sensor cleaning sequence can include cleaning a sensor with a plurality of sensor cleaning units. For example, a computing system may determine that a patch of dirt has accumulated on a camera lens, thereby occluding the camera's field of view over a number of frames of imagery. The computing system determine a sensor cleaning sequence in which a sensor is first cleaned with a liquid cleaning unit in order to spray liquid onto the camera lens in order to remove the dirt. However, the liquid may also need to be removed for proper operation of the sensor. The computing system can determine a sensor cleaning sequence wherein the sensor is subsequently cleaned by a gas cleaning unit in order to spray air onto the sensor in order to remove the liquid.

In some implementations, a sensor cleaning sequence can be a pattern. For example, in some implementations, based on one or more operating conditions and parameters as described herein, a forward facing sensor 101 can be prioritized for cleaning at a higher frequency than a rear facing sensor 101, or vice-versa. In some implementations, the sensor cleaning sequence can be a pattern, such as a pattern wherein the forward facing sensor 101 is cleaned more frequently than the rear facing sensor (e.g., cleaning the forward facing sensor twice and cleaning the rear facing sensor once). In some implementations, the pattern can be repeated, such as at specific intervals.

In some implementations, a sensor cleaning sequence can be a pattern that is modified to preferentially clean one or more sensors 101. For example, the sensor cleaning sequence can be a pattern wherein a forward facing sensor 101 is cleaned more frequently than a rear facing sensor 101, but a computing system determines that a rear facing sensor 101 requires cleaning. In such a situation, the computing system can modify the pattern in order to clean the rear facing sensor 101 before the next scheduled sensor cleaning action according to the pattern. For example, rather than cleaning a forward facing sensor 101, the rear facing sensor 101 can be cleaned.

At (606), the method (600) can include controlling one or more sensor cleaning units to sequentially clean the one or more sensors based at least in part on the sensor cleaning sequence. For example, controlling one or more sensor cleaning units to sequentially clean one or more sensors 101 can include any plurality of control actions which cause one or more sensor cleaning units to clean one or more sensors 101.

For example, in some implementations, controlling the one or more sensor cleaning units to sequentially clean one or more sensors can include causing a first sensor cleaning unit to clean a first sensor at a first point in time, and causing a second sensor cleaning unit to clean a second sensor at a second point in time. For example, the computing system can control one or more solenoids to cause a pressurized flow of a fluid (e.g., gas or liquid) to first spray onto a first sensor, such as a forward facing sensor 101. The computing system can subsequently control one or more solenoids to cause a pressurized flow of a fluid (e.g., gas or liquid) to spray onto a second sensor, such as a rear facing sensor 101. In some implementations, controlling the one or more sensor cleaning units to sequentially clean the one or more sensors 101 can further include causing the first sensor cleaning unit to clean the first sensor 101 at a third point in time. For example, the computing system can control one or more solenoids to cause a pressurized flow of a fluid (e.g., gas or liquid) to subsequently spray onto the first sensor 101 following controlling the second sensor cleaning unit to clean the second sensor 101.

As another example, controlling the one or more sensor cleaning units to sequentially clean one or more sensors 101 can include causing a sensor cleaning unit to clean a sensor 101 a plurality of times. For example, a sensor cleaning sequence can be a sequence of cleaning a single sensor a plurality of times, such as at a frequency or according to a pattern. As an example, the computing system can control one or more actuators to cause a sensor wiper device to articulate across the surface of a sensor in order to clean the sensor 101 a plurality of times, such as at the frequency or according to the pattern.

As another example, controlling the one or more sensor cleaning units to sequentially clean one or more sensors can include causing a plurality of sensor cleaning units to clean a sensor 101. For example, a sensor cleaning sequence can be a sequence of cleaning a single sensor 101 with a first sensor cleaning unit (e.g., liquid cleaning unit), and subsequently cleaning the first sensor 101 with a second sensor cleaning unit (e.g., gas cleaning unit or sensor wiper device).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to clean autonomous vehicle sensors, the method comprising:
    obtaining, by a computing system comprising one or more computing devices, data indicative of a sensor condition for an autonomous vehicle;
    determining, by the computing system, a sensor cleaning sequence for one or more sensor cleaning units of the autonomous vehicle based at least in part on the data indicative of the sensor condition, wherein the one or more sensor cleaning units are configured to respectively clean one or more sensors of the autonomous vehicle, wherein the sensor cleaning sequence comprises a plurality of control actions to cause the one or more sensor cleaning units to clean a plurality of sensors or a plurality of control actions to cause the one or more sensor cleaning units to clean a single sensor a plurality of times according to a frequency; and
    controlling, by the computing system, the one or more sensor cleaning units to sequentially clean the plurality of sensors or the single sensor based at least in part on the sensor cleaning sequence.

2. The computer-implemented method of claim 1, wherein obtaining, by the computing system, data indicative of the sensor condition for the autonomous vehicle comprises obtaining, by the computing system, a windshield wiper control signal from a windshield wiper control device of the autonomous vehicle.

3. The computer-implemented method of claim 1, wherein obtaining, by the computing system, data indicative of the sensor condition for the autonomous vehicle comprises obtaining, by the computing system, data indicative of a weather condition from a precipitation sensor of the autonomous vehicle.

4. The computer-implemented method of claim 1, wherein obtaining, by the computing system, data indicative of the sensor condition for the autonomous vehicle comprises obtaining, by the computing system, data indicative of a weather condition from a LIDAR sensor of the autonomous vehicle.

5. The computer-implemented method of claim 4, wherein the data indicative of the weather condition comprises a reflection pattern or a point cloud pattern that is representative of the weather condition.

6. The computer-implemented method of claim 1, wherein obtaining, by the computing system, data indicative of the sensor condition for the autonomous vehicle comprises obtaining, by the computing system, data indicative of a weather condition from a weather condition monitoring system external to the autonomous vehicle.

7. The computer-implemented method of claim 1, wherein obtaining, by the computing system, data indicative of a sensor condition for the autonomous vehicle comprises obtaining, by the computing system, sensor data from a first sensor of the autonomous vehicle.

8. The computer-implemented method of claim 1, wherein determining, by the computing system, the sensor cleaning sequence comprises determining, by the computing system, the sensor cleaning sequence based at least in part on a speed of the autonomous vehicle.

9. The computer-implemented method of claim 1, wherein determining, by the computing system, the sensor cleaning sequence comprises determining, by the computing system, the sensor cleaning sequence based at least in part on a type of weather condition the autonomous vehicle is operating in.

10. The computer-implemented method of claim 1, wherein determining, by the computing system, the sensor cleaning sequence comprises determining, by the computing system, the frequency based at least in part on an operational frequency of one or more windshield wipers of the autonomous vehicle.

11. The computer-implemented method of claim 1, wherein controlling, by the computing system, the one or more sensor cleaning units to sequentially clean the plurality of sensors or the single sensor based at least in part on the sensor cleaning sequence comprises:
  causing a first sensor cleaning unit to clean a first sensor at a first point in time; and
  causing a second sensor cleaning unit to clean a second sensor at a second point in time;
  wherein the second point in time is subsequent to the first point in time.

12. The computer-implemented method of claim 11, wherein controlling, by the computing system, the one or more sensor cleaning units to sequentially clean the plurality of sensors or the single sensor based at least in part on the sensor cleaning sequence comprises:
  causing the first sensor cleaning unit to clean the first sensor at a third point in time;
  wherein the third point in time is subsequent to the second point in time.

13. The computer-implemented method of claim 1, wherein the sensor cleaning sequence comprises a pattern that is repeated at an interval.

14. The computer-implemented method of claim 1, wherein obtaining, by the computing system, data indicative of a sensor condition comprises obtaining, by the computing system, a windshield wiper fluid spray signal from a windshield wiper control device;
  wherein determining, by the computing system, the sensor cleaning sequence comprises determining the sensor cleaning sequence based at least in part on the windshield wiper fluid spray signal; and
  wherein controlling, by the computing system, the one or more sensor cleaning units to sequentially clean the plurality of sensors or the single sensor based at least in part on the sensor cleaning sequence comprises controlling, by the computing system, at least one liquid cleaning unit to clean at least one sensor.

15. The computer-implemented method of claim 1, wherein controlling, by the computing system, the one or more sensor cleaning units to sequentially clean the plurality of sensors or the single sensor based at least in part on the sensor cleaning sequence comprises:
  cleaning a first sensor with a liquid cleaning unit; and
  subsequently cleaning the first sensor with a gas cleaning unit.

16. A sensor cleaning system for an autonomous vehicle, comprising:
  one or more sensor cleaning units configured to respectively clean one or more sensors of an autonomous vehicle;
  a computing system comprising one or more processors and one or more non-transitory computer-readable media that collectively store instructions that, when executed by the one or more processors, cause the computing system to perform operations, the operations comprising:
    obtaining data indicative of a sensor condition for the autonomous vehicle;
    determining a sensor cleaning sequence for the one or more sensor cleaning units on the autonomous vehicle based at least in part on the data indicative of the sensor condition, wherein the sensor cleaning sequence comprises a plurality of control actions to cause the one or more sensor cleaning units to clean a plurality of sensors or a plurality of control actions to cause the one or more sensor cleaning units to clean a single sensor a plurality of times according to a frequency; and
    controlling the one or more sensor cleaning units to sequentially clean the plurality of sensors or the single sensor based at least in part on the sensor cleaning sequence.

17. The sensor cleaning system of claim 16, wherein the one or more sensors are configured to obtain sensor data, wherein the computing system is configured to obtain data indicative of the sensor condition for the autonomous vehicle from one or more of: a windshield wiper control device of the autonomous vehicle, a precipitation sensor of the autonomous vehicle, a LIDAR sensor of the autonomous vehicle, the one or more sensors configured to obtain sensor data, or a weather condition monitoring system external to the autonomous vehicle.

18. The sensor cleaning system of claim 16, wherein the one or more sensor cleaning units comprises one or more of: a gas cleaning unit, a liquid cleaning unit, and a sensor wiper device.

19. The sensor cleaning system of claim 16, wherein the sensor cleaning sequence is determined based at least in part on a speed of the autonomous vehicle, a type of weather condition the autonomous vehicle is operating in, an operational frequency of one or more windshield wipers of the autonomous vehicle, or data from the one or more sensors.

20. An autonomous vehicle, comprising:
a plurality of sensors configured to obtain sensor data; and
a sensor cleaning system that performs cleaning of the plurality of sensors of the autonomous vehicle, the sensor cleaning system comprising:
a plurality of sensor cleaning units configured to respectively clean the plurality of sensors; and
a computing system comprising one or more control devices, the computing system configured to:
obtain data indicative of a sensor condition for the autonomous vehicle;
determine a sensor cleaning sequence for one or more of the sensor cleaning units in the plurality based at least in part on the data indicative of the sensor condition, wherein the sensor cleaning sequence comprises a plurality of control actions to cause the one or more sensor cleaning units in the plurality to clean the plurality of sensors or a plurality of control actions to cause the one or more sensor cleaning units in the plurality to clean a single sensor a plurality of times according to a frequency; and
control the one or more sensor cleaning units to sequentially clean the plurality of sensors or the single sensor based at least in part on the sensor cleaning sequence;
wherein the computing system is configured to obtain data indicative of the sensor condition for the autonomous vehicle from one or more of: a windshield wiper control device of the autonomous vehicle, a precipitation sensor of the autonomous vehicle, a LIDAR sensor of the autonomous vehicle, one or more of the plurality of sensors, or a weather condition monitoring system external to the autonomous vehicle.

* * * * *